(12) United States Patent
Oya et al.

(10) Patent No.: US 9,519,090 B2
(45) Date of Patent: Dec. 13, 2016

(54) UNIAXIALLY STRETCHED MULTI-LAYER LAMINATE FILM, POLARIZING PLATE COMPRISING SAME, OPTICAL MEMBER FOR LIQUID CRYSTAL DISPLAY DEVICE, AND LIQUID CRYSTAL DISPLAY DEVICE

(71) Applicant: TEIJIN LIMITED, Osaka-shi, Osaka (JP)

(72) Inventors: Taro Oya, Gifu (JP); Kana Tanabu, Gifu (JP); Takashi Nakahiro, Gifu (JP); Tetsuo Yoshida, Gifu (JP); Hiromi Shiroma, Gifu (JP); Tomoko Shimizu, Gifu (JP)

(73) Assignee: TEIJIN LIMITED, Osaka (JP)

( * ) Notice: Subject to any disclaimer, the term of this patent is extended or adjusted under 35 U.S.C. 154(b) by 61 days.

(21) Appl. No.: 14/407,324

(22) PCT Filed: Sep. 20, 2013

(86) PCT No.: PCT/JP2013/075415
§ 371 (c)(1),
(2) Date: Dec. 11, 2014

(87) PCT Pub. No.: WO2014/046225
PCT Pub. Date: Mar. 27, 2014

(65) Prior Publication Data
US 2015/0124194 A1 May 7, 2015

(30) Foreign Application Priority Data

Sep. 24, 2012 (JP) .................................. 2012-209560
Jul. 4, 2013 (JP) .................................. 2013-140819
Aug. 23, 2013 (JP) .................................. 2013-173473

(51) Int. Cl.
*C09K 19/00* (2006.01)
*G02B 5/30* (2006.01)
(Continued)

(52) U.S. Cl.
CPC ............. *G02B 5/3025* (2013.01); *B32B 27/08* (2013.01); *B32B 27/20* (2013.01); *B32B 27/36* (2013.01);
(Continued)

(58) Field of Classification Search
CPC .......... B32B 27/36; B32B 27/08; B32B 27/18; B32B 2250/05; B32B 2307/42; B32B 2367/00; B32B 2457/202; G02B 5/3025; G02B 5/208; G02B 5/305; G02F 1/133536; G02F 2201/086; C08G 63/187; C08G 63/189; Y10T 428/10; Y10T 428/105; Y10T 428/1036; Y10T 428/1041
(Continued)

(56) References Cited

U.S. PATENT DOCUMENTS

2002/0186474 A1  12/2002  Weber et al.
2008/0151371 A1   6/2008  Weber et al.
(Continued)

FOREIGN PATENT DOCUMENTS

EP    2226658 A1    9/2010
JP    04-268505 A   9/1992
(Continued)

OTHER PUBLICATIONS

Communication dated Dec. 14, 2015, from the European Patent Office in counterpart European Application No. 13838328.6.
(Continued)

*Primary Examiner* — Ruiyun Zhang
(74) *Attorney, Agent, or Firm* — Sughrue Mion, PLLC

(57) ABSTRACT

A uniaxially stretched multi-layer laminate film that exhibits a high polarization performance of 99.5% or more in a simpler configuration than before, a polarizing plate that is composed of the same, an optical member for a liquid crystal display device, and a liquid crystal display device are
(Continued)

provided. Namely, in the uniaxially stretched multi-layer laminate film in which a first layer and a second layer are alternately laminated, the uniaxially stretched multi-layer laminate film includes an intermediate layer that has a thickness of 2 μm or more and 30 μm or less; the first layer is composed of a polyester containing a naphthalene dicarboxylic acid ester; the second layer is composed of a copolymer polyester and is an optically isotropic layer that has an average refractive index of 1.50 or more and 1.60 or less; the first layer, the second layer, both first and second layers, or the intermediate layer contains a visible light absorbent, which has a weight loss of less than 10% when it is kept at 300° C. for 1 hour, in an amount of 200 ppm or more and 2500 ppm or less on the basis of the weight of the layer; the uniaxially stretched multi-layer laminate film has a polarization degree of 99.5 or more; and the average transmittance Ts for S-polarized light in a wavelength range of 400 nm to 800 nm is 60% or more.

20 Claims, 2 Drawing Sheets

(51) Int. Cl.
    B32B 27/36      (2006.01)
    C08G 63/187     (2006.01)
    C08G 63/199     (2006.01)
    B32B 27/08      (2006.01)
    G02B 1/04       (2006.01)
    G02B 5/20       (2006.01)
    G02F 1/1335     (2006.01)
    B32B 27/20      (2006.01)
(52) U.S. Cl.
    CPC .......... *C08G 63/187* (2013.01); *C08G 63/199* (2013.01); *G02B 1/04* (2013.01); *G02B 5/208* (2013.01); *G02B 5/305* (2013.01); *G02B 5/3083* (2013.01); *G02F 1/1336* (2013.01); *G02F 1/133536* (2013.01); *B32B 2250/05* (2013.01); *B32B 2264/108* (2013.01); *B32B 2307/42* (2013.01); *B32B 2307/516* (2013.01); *B32B 2367/00* (2013.01); *B32B 2457/202* (2013.01); *G02F 2201/086* (2013.01); *Y10T 428/1036* (2015.01); *Y10T 428/1041* (2015.01)
(58) Field of Classification Search
    USPC ... 428/1.1, 1.3, 1.31, 1.33, 1.5; 349/96, 113; 359/361, 485.01, 485.03; 528/176, 209
    See application file for complete search history.

(56) References Cited

U.S. PATENT DOCUMENTS

| | | |
|---|---|---|
| 2010/0247811 A1 | 9/2010 | Yokota et al. |
| 2011/0043732 A1 | 2/2011 | Weber et al. |
| 2011/0109966 A1 | 5/2011 | Yu et al. |
| 2011/0249325 A1 | 10/2011 | Zehentmaier et al. |
| 2012/0249935 A1* | 10/2012 | Oya .................. B32B 27/08 349/96 |

FOREIGN PATENT DOCUMENTS

| | | | | | |
|---|---|---|---|---|---|
| JP | 09-506837 | A | 7/1997 | | |
| JP | 09-507308 | A | 7/1997 | | |
| JP | 2002509044 | A | 3/2002 | | |
| JP | 2004-507781 | A | 3/2004 | | |
| JP | 2010024370 | A | 2/2010 | | |
| JP | WO 2011074701 | A1 * | 6/2011 | ............. | B32B 27/08 |
| JP | 2011-528450 | A | 11/2011 | | |
| JP | 2012-13919 | A | 1/2012 | | |
| JP | 2012-173402 | A | 9/2012 | | |
| KR | 1020100008011 | A | 1/2010 | | |
| WO | 9936478 | A1 | 7/1999 | | |
| WO | 01/47711 | A1 | 7/2001 | | |
| WO | 03074272 | A1 | 9/2003 | | |
| WO | 2009/084426 | A1 | 7/2009 | | |

OTHER PUBLICATIONS

Communication dated Nov. 10, 2015, from the European Patent Office in counterpart European Application No. 13838328.6.
International Search Report of PCT/JP2013/075415 dated Oct. 29, 2013.

* cited by examiner

UNIAXIALLY STRETCHED MULTI-LAYER LAMINATE FILM, POLARIZING PLATE COMPRISING SAME, OPTICAL MEMBER FOR LIQUID CRYSTAL DISPLAY DEVICE, AND LIQUID CRYSTAL DISPLAY DEVICE

CROSS REFERENCE TO RELATED APPLICATIONS

This is a National Stage of International Application No. PCT/JP2013/075415 filed Sep. 20, 2013, claiming priority based on Japanese Patent Application No. 2012-209560 filed Sep. 24, 2012, the contents of all of which are incorporated herein by reference in their entirety.

TECHNICAL FIELD

The present invention relates to a uniaxially stretched multi-layer laminate film, a polarizing plate composed of the same, an optical member for a liquid crystal display device, and a liquid crystal display device. More specifically, the present invention relates to a uniaxially stretched multi-layer laminate film composed of a uniaxially stretched multi-layer laminate film and is capable of exhibiting high polarization performance comparable to an absorption type polarizing plate even though having a simpler configuration as compared with conventional ones, a polarizing plate composed of the same, an optical member for a liquid crystal display, and a liquid crystal display device.

BACKGROUND ART

A liquid crystal display device (LCD) makes it possible to serve as a display through regulating transmission of light irradiated from a light source by using a liquid crystal panel composed of a liquid crystal cell and polarizing plates disposed on both sides thereof. As the polarizing plates attached to the liquid crystal cell, an absorption type polarizing plate which is called a light-absorption type dichroic linear polarizing plate is generally used. A polarizing plate in which iodine-containing PVA is protected with triacetyl cellulose (TAC) is widely used.

The absorption type polarizing plate transmits light that is polarized in a direction of transmission axis and absorbs almost all of light that is polarized in a direction perpendicular to the transmission axis. It is pointed out that about 50% of non-polarized light irradiated from a light source device is absorbed by the absorption type polarizing plate, and that light utilization efficiency is lowered. Therefore, in order to use efficiently the polarized light in the direction perpendicular to the transmission axis, a configuration, wherein a reflective polarizer called a brightness enhancement film is used between the light source and the liquid crystal panel, has been investigated. As an example of the reflective polarizer, a polymer film that employs optical interference has been investigated (Patent Literature 1 and others).

On the other hand, regarding the polarizing plate attached to the liquid crystal cell, various kinds of lamination configurations including a reflection display that uses outside light and a transmission display that uses backlight, in which the absorption type polarizing plate and reflection type polarizing plate are used in combination, have also been investigated in accordance with kinds and purposes of light used in the display device. An example of the reflective polarizing plate includes an attempt in which a birefringent dielectric multi-layer film is used.

An example of reflective polarizing polymer films, which employ a birefringent multi-layer structure and have been investigated so far, includes Patent Literatures 2 to 4, for example. A reflective polarizing polymer film described in Patent Literature 3 and others exhibits a certain level of polarization performance by means of: using polyethylene-2,6-naphthalene dicarboxylate (hereinafter, called as 2,6-PEN in some cases) for a high refractive index layer and PEN copolymerized with a thermoplastic elastomer or terephthalic acid in an amount of 30 mol % as a low refractive index layer; increasing the difference in interlayer refractive indexes in a stretching direction (X direction) through stretching so as to enhance reflectance of P polarization; and, on the other hand, decreasing the difference in interlayer refractive indexes in a direction (Y direction) perpendicular to the in-plane X direction of the film so as to enhance transmission of S-polarized light.

However, when the polarization performance is tried to be enhanced to the level of the dichroic linear polarizing plate, difference arises between the refractive index in Y direction and the refractive index in the direction of film thickness (Z direction) while stretch develops in X direction; when the difference in the interlayer refractive indexes in Y direction is accorded, the difference in the interlayer refractive indexes in Z direction becomes large; accordingly, partial reflection of light that enters in an oblique direction makes hue shift of transmitted light larger.

Therefore, a liquid crystal display device that uses the polymer film having the above multi-layer structure by itself as one of the polarizing plates of a liquid crystal cell has not been put into practical use yet.

In addition, regarding a reflective polarizing polymer film that is replaceable for the absorption type polarizing plate and has a multi-layer structure and a higher polarization degree than before, a proposal of using a specific polymer for a high reflective index layer and a capability of using for the polarizing plates disposed adjacent to the liquid crystal cell are described in Patent Literature 5. However, although the reflective polarizing film attains a high polarization degree of around 97% to 98%, a still higher level of polarization performance has not been attained.

On the other hand, Patent Literatures 6 and 7 and others propose a configuration of a hybrid polarizer in which an absorption polarizer or an absorption element is disposed between two uniaxial birefringent reflective polarizers. When the absorption element and others are not used between the two uniaxial birefringent reflective polarizers, among polarized light components that are to be reflected, half of transmitted leaking from the first reflective polarizer leaks also from the second reflective polarizer due to the effect of multiple reflections. In order to reduce the leak of the transmitted light, the absorption element and others are described to be disposed between the two uniaxial birefringent reflective polarizers.

In addition, as an illustrative embodiment of the hybrid polarizer, an embodiment and others are described, in which an alternative laminate is used as a reflective polarizer, wherein the alternative laminate is composed of a uniaxially aligned layer composed of 90% of polyethylene naphthalate and 10% of polyethylene terephthalate and an isotropic layer having low refractive index composed of a blend of polycarbonate and copolymer polyester, and an absorption layer obtained by mixing a dichroic dye with PVA is coated on a PET cast film and is uniaxially aligned is disposed between the two reflective polarizers. Also, in the other illustrative embodiments, an absorption element, formed in advance by coating in a step different from the step in which the reflective polarizers are formed, is disposed between the two reflective polarizers. Thus, a complicated fabrication method has been employed. Furthermore, in these embodiments of the hybrid polarizers, lowering in adhesion between the reflective polarizer and the absorption element is concerned.

Patent Literature 1: Japanese Patent Unexamined Patent Application Publication No. H9-507308
Patent Literature 2: Japanese Patent Application Laid-Open Publication No. H4-268505
Patent Literature 3: Japanese Patent Unexamined Patent Application Publication No. H9-506837
Patent Literature 4: International Publication No. WO 01/47711
Patent Literature 5: Japanese Patent Application Laid-Open Publication No. 2012-13919
Patent Literature 6: U.S. Pat. No. 2008/0151371
Patent Literature 7: U.S. Pat. No. 2011/0043732

SUMMARY OF INVENTION

Technical Problem

An object of the present invention is to provide: a uniaxially stretched multi-layer laminate film capable of exhibiting a high polarization performance of 99.5% or more with a simpler configuration than before; a polarizing plate composed of the same; an optical member for a liquid crystal display device; and a liquid crystal display device.

A second object of the present invention is to provide: a uniaxially stretched multi-layer film capable of exhibiting a high polarization performance of 99.5% or more with a simpler configuration than before, also having an excellent high durability against UV light even though the film is a polyester film containing naphthalene dicarboxylic acid ester and has a multi-layer structure, free from process contamination caused by addition of UV light absorbent and bleeding out of the film; a polarizing plate that is composed of the same; an optical member for a liquid crystal display device; and a liquid crystal display device.

Solution to Problem

As a result of intensive studies performed by the present inventors so as to achieve the aforementioned objects, it has been found that, by adding a visible light absorbent having excellent heat resistance in a minute amount to a first layer, a second layer, both first and second layers, or an intermediate layer that compose the uniaxially stretched multi-layer laminate film, multiple reflections that generate light leak components are prevented from being developed or generated multiple reflection components are effectively absorbed, and high transmission of transmitted polarized light components can be maintained. And, it has been found that, by using the uniaxially stretched multi-layer film that has the aforementioned configuration, an extremely high polarization degree of 99.5% or more can be achieved by the uniaxially stretched multi-layer laminate film by itself which is used for the reflective polarizer, without using complex configurations such as reflective polarizer/absorption element/reflective polarizer. On the basis of these findings, the present invention has been accomplished.

Furthermore, regarding the second object, it has been found that the aforementioned object can be achieved by using, in addition to the above configuration, a UV light absorbent that has an excellent heat resistance at 300° C. as well as an excellent UV light absorbing performance is used in a second layer that has a low refractive index. Based on this finding, the present invention has been accomplished.

Namely, a first object of the present invention is achieved by a uniaxially stretched multi-layer laminate film (item 1), which is specified as: in a uniaxially stretched multi-layer laminate film in which a first layer and a second layer are alternately laminated, the uniaxially stretched multi-layer laminate film has an intermediate layer having a thickness of 2 μm or more and 30 μm or less, (1) the first layer is composed of a polyester containing a naphthalene dicarboxylic acid ester,
(2) the second layer is composed of a copolymer polyester and is an optically isotropic layer having an average refractive index of 1.50 or more and 1.60 or less,
(3) the first layer, the second layer, both first and second layers, or the intermediate layer contain a UV light absorbent that exhibits a weight loss of less than 10% when it is kept at 300° C. for 1 hour, in an amount of 200 ppm or more and 2500 ppm or less on the basis of the weight of each layer, and
(4) the uniaxially stretched multi-layer laminate film has a polarization degree (P %) represented by the following equation (1) of 99.5 or more and an average transmission Ts of 60% or more for S-polarized light in a wavelength range of 400 nm to 800 nm, $$\text{Polarization degree}(P)=\{(Ts-Tp)/(Tp+Ts)\}\times 100 \qquad (1)$$

in the equation (1), Tp represents an average transmission for P-polarized light in a wavelength range of 400 nm to 800 nm and Ts represents an average transmission for S-polarized light in a wavelength range of 400 nm to 800 nm.

The uniaxially stretched multi-layer laminate film of the present invention includes, as a preferable embodiment, at least any one of the following items 2 to 13.

2. The uniaxially stretched multi-layer laminate film as described in item 1, wherein a UV light absorbent that exhibits a weight loss of less than 3% when it is kept at 300° C. for 1 hour is further included in a layer derived from the second layer and/or the intermediate layer in an amount of 0.2 wt % to 5 wt %, and the uniaxially stretched multi-layer laminate film has a transmission of less than 5% for S-polarized light at 380 nm.
3. The uniaxially stretched multi-layer laminate film as described in item 2, wherein the transmission of the uniaxially stretched multi-layer laminate film for S-polarized light at 400 nm is 10% or more and less than 80%.
4. The uniaxially stretched multi-layer laminate film as described in any of items 1 to 3, wherein the polyester that composes the first layer and contains the naphthalene dicarboxylic acid ester is a copolymer polyester that contains the naphthalene dicarboxylic acid ester.
5. The uniaxially stretched multi-layer laminate film as described in item 4, wherein the copolymer polyester that composes the first layer and contains the naphthalene dicarboxylic acid ester, contains
   (i) a component represented by the following formula (A) as a dicarboxylic acid component, in an amount of 5 mol % or more ad 50 mol % or less and a naphthalene dicarboxylic acid component in an amount of 50 mol % or more and 95 mol % or less, (A)

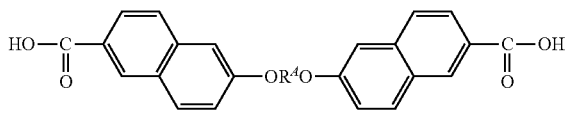

in the formula (A), $R^4$ represents an alkylene group having 2 to 10 carbon atoms, and
  (ii) as a diol component, a diol component that has an alkylene group having a 2 to 10 carbon atoms in an amount of 90 mol % or more and 100 mol % or less.
6. The uniaxially stretched multi-layer laminate film as described in any of items 1 to 5, wherein the copolymer polyester that composes the second layer is a copolymer polyester that has a glass transition temperature of 90° C. or higher.
7. The uniaxially stretched multi-layer laminate film as described in any of items 1 to 6, wherein the copolymer polyester that composes the second layer contains, as a copolymer component, an alicyclic diol.
8. The uniaxially stretched multi-layer laminate film as described in item 7, wherein the alicyclic diol is at least one kind selected from the group consisting of spiroglycol, tricyclodecane dimethanol, and cyclohexane dimethanol.
9. The uniaxially stretched multi-layer laminate film as described in any of items 1 to 8, wherein the visible light absorbent is at least one kind selected from the group consisting of inorganic pigment, organic dye, and organic pigment, and is black or gray.
10. The uniaxially stretched multi-layer laminate film as described in item 9, wherein the inorganic pigment is carbon black.
11. The uniaxially stretched multi-layer laminate film as described in any of items 2 to 10, wherein the UV light absorbent is a compound represented by the following formula (B) or (C),

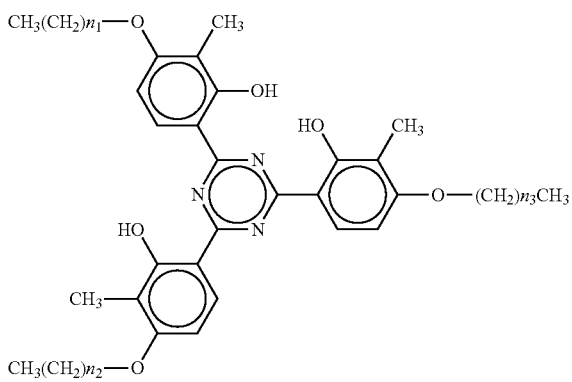

in the formula (B), each of n1, n2, and n3 represents respectively an integer of 4 to 10.

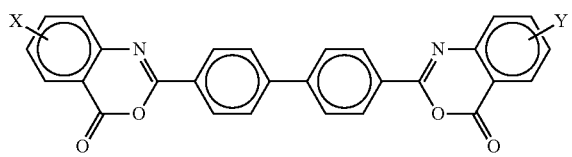

in the formula (C), each of X and Y represents a hydrogen atom or an alkyl group having 1 to 4 carbon atoms.
12. The uniaxially stretched multi-layer laminate film as described in any of items 1 to 11, used in a manner disposed adjacent to a liquid crystal cell.

13. The uniaxially stretched multi-layer laminate film as described in any of items 1 to 12, obtained by a coextrusion process.

In addition, a polarizing plate (item 14) composed of the uniaxially stretched multi-layer laminate film described in the present invention is also included.

Furthermore, an optical member (item 15) used for a liquid crystal display device and composed of a first polarizing plate composed of the polarizing plate of the present invention, a liquid crystal cell, and a second polarizing plate laminated in this order is also included in the present invention. As a preferable embodiment thereof, at least any one embodiment of the following items 16 to 18 is also included.
16. The optical member as described in item 15, which is used for a liquid crystal display device, wherein a configuration in which the first polarizing plate is laminated with an absorption type polarizing plate is excluded.
17. The optical member as described in item 15 or 16, which is used for a liquid crystal display device, wherein the second polarizing plate is an absorption type polarizing plate.
18. An optical member composed of a first polarizing plate, a liquid crystal cell, and a second polarizing plate which are laminated in this order, wherein the first polarizing plate and the second polarizing plate are composed of the polarizing plate as described in item 14.

The present invention further includes a liquid crystal display device (item 19) which is equipped with a light source and the optical member which is used for a liquid crystal display device and is described in any of items 15 to 18. As a preferable embodiment thereof, the liquid crystal display device (item 20), which is described in item 19 and has no additional reflective polarizing plate between the light source and the first polarizing plate, is also included.

Advantageous Effects of Invention

According to the present invention, the uniaxially stretched multi-layer laminate film of the present invention can exhibit, by itself, an extremely high polarization degree of 99.5% or more and can provide, with a simpler configuration than before, a high performance reflective polarizing plate comparable to an absorption type polarizing plate. Accordingly, an optical member for a liquid crystal display device and a liquid crystal display device that have a high contrast can be provided.

In addition, advantageous effects corresponding to the second object of the present invention include: the uniaxially stretched multi-layer laminate film of the present invention can exhibit, by itself, an extremely high polarization degree of 99.5% or more and can provide, with a simpler configuration than before, a high performance reflective polarizing plate comparable to an absorption type polarizing plate; furthermore, even though the polyester film contains a naphthalene dicarboxylic acid ester and has a multi-layer structure, the film is excellent in having a high durability against UV light and is free from process contamination caused by the addition of UV light absorbent and bleeding out from the film; thus, an optical member for a liquid crystal display device and a liquid crystal display device that have a high contrast can be provided.

SYMBOLS IN THE DRAWING

Figure 1:
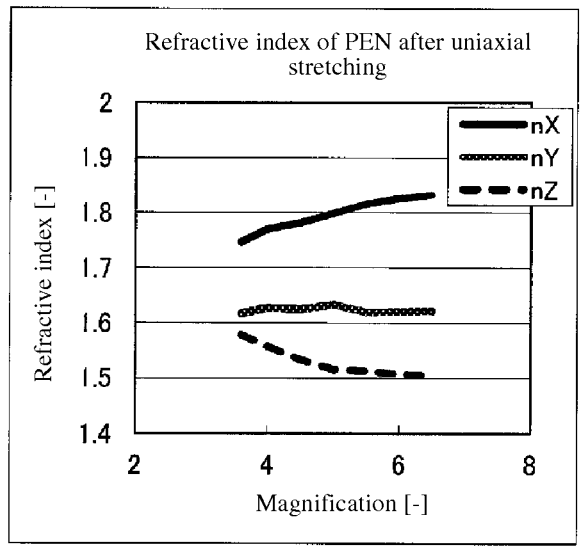
FIG. 1 shows refractive indexes of 6-PEN (homo PEN) in a stretched direction (X direction) after uniaxially stretching in a direction perpendicular to the stretching direction (Y direction), and in a thickness direction (Z direction); they are represented by nX, nY, and nZ, respectively.

1 Second polarizing plate
2 Liquid crystal cell
3 First polarizing plate
4 Light source
5 Liquid crystal panel

BEST MODE FOR CARRYING OUT THE INVENTION

The uniaxially stretched multi-layer laminate film of the present invention, in a uniaxially stretched multi-layer laminate film in which a first layer and a second layer are alternately lamented, has an intermediate layer having a thickness of 20 μm or more and 30 μm or less, wherein,
(1) the first layer is composed of a polyester containing a naphthalene dicarboxylic acid ester;
(2) the second layer is composed of a copolymer polyester and is an optically isotropic layer having an average refractive index of 1.50 or more and 1.60 or less;
(3) the first layer, the second layer, both first and second layers, or the intermediate layer contain a UV light absorbent that exhibits a weight loss of less than 10% when it is kept at 300° C. for 1 hour in an amount of 200 ppm or more and 2500 ppm or less on the basis of the weight of each layer; and
(4) the uniaxially stretched multi-layer laminate film has a polarization degree (P %) of 99.5 or more which is represented by the following equation (1) and an average transmission Ts for S-polarized light of 60% or more in a wavelength range of 400 nm to 800 nm.

$$\text{Polarization degree}(P) = \{(Ts - Tp)/(Tp + Ts)\} \times 100 \quad (1)$$

In the equation (1), Tp represents an average transmission for P-polarized light in a wavelength range of 400 nm to 800 nm and Ts represents an average transmission for S-polarized light in a wavelength range of 400 nm to 800 nm.

A visible light absorbent having excellent heat resistance is added in a minute amount to the first layer, the second layer, or both first and second layers that compose the alternately laminated portion of the uniaxially stretched multi-layer laminate film, so that generation of multiple reflections that generate light leak components is suppressed and a high transmission of transmitted polarized light components is maintained. Accordingly, the uniaxially stretched multi-layer laminate film of the present invention advantageously achieves an extremely high polarization degree of 99.5% or more by itself.

In addition, by using a method of further adding a visible light absorbent having a high heat resistance in a minute amount to an intermediate layer that is disposed inside of the multi-layer structure and has a specified thickness at which optical interference is not affected, multiple reflection components generated inside of the multi-layer structure is absorbed efficiently and a high transmission of transmitted polarized light components is maintained. Accordingly, the uniaxially stretched multi-layer laminate film of the present invention can achieve an extremely high polarization degree of 99.5% or more by itself.

Hereinafter, each configuration of the present invention is described in detail.

Uniaxially Stretched Multi-Layer Laminate Film

The uniaxially stretched multi-layer laminate film of the present invention is a uniaxially stretched film having a multi-layer structure where a first layer and a second layer are alternately laminated. In the present invention, the first layer represents a layer having a higher refractive index than the second layer (in some cases, referred to as a high refractive index layer) and the second layer represents a layer having a lower refractive index than the first layer (in some cases, referred to as a low refractive index layer). In some cases, the refractive index in the stretched direction (X direction) is referred to as nX, the refractive index in the direction (Y direction) perpendicular to the stretched direction is referred to as nY, and the refractive index in the film thickness direction (Z direction) is referred to as nZ.

First Layer

The first layer of the present invention is composed of a polyester containing a naphthalene dicarboxylic acid ester. In addition, the polyester containing the naphthalene dicarboxylic acid ester is preferably a copolymer polyester (hereinafter, referred to as copolymer polyester (1), in some cases) containing a naphthalene dicarboxylic acid ester. More preferably, the copolymer polyester contains a naphthalene dicarboxylic acid component in a range of 50 mol % to 95 mol % on the basis of the total mol number of the dicarboxylic acid component. Furthermore, within a range in the polarization degree and S-polarized light transmission of the present invention are not affected, the first layer of the present invention may contain, as a second polymer component, a thermoplastic resin other than the polyester containing the naphthalene dicarboxylic acid ester in a range of 10 wt % or less on the basis of the weight of the first layer.

In the present invention, as a more preferable copolymer polyester (1), cited is a copolymer polyester obtained by polycondensation of a dicarboxylic acid component and a diol component to be described in detail below.

Dicarboxylic Acid Component

A preferable example of the dicarboxylic acid component that composes the copolymer polyester (1) in the present invention includes a component represented by the following formula (A) in an amount of 5 mol % or more and 50 mol % or less and a naphthalene dicarboxylic acid component in an amount of 50 mol % or more and 95 mol % or less.

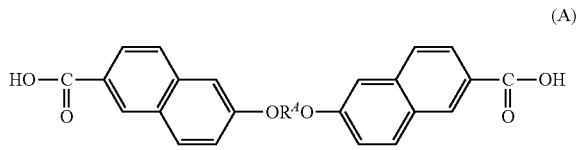

(A)

In the formula (A), $R^4$ represents an alkylene group having 2 to 10 carbon atoms.

Here, the amount of each dicarboxylic acid component refers to the amount on the basis of the total mol number of the dicarboxylic acid component. Regarding the component represented by the formula (A), in the formula, $R^4$ is an alkylene group having 2 to 10 carbon atoms. Examples of the alkylene group include an ethylene group, a propylene group, an isopropylene group, a tetramethylene group, a hexamethylene group, an octamethylene group and the like. Particularly, an ethylene group is preferable.

The lower limit of the amount of the component represented by the formula (A) is preferably 7 mol %, more preferably 10 mol %, and still more preferably 15 mol %. The upper limit of the amount of the component represented by the formula (A) is preferably 45 mol %, more preferably 40 mol %, still more preferably 35 mol %, and particularly preferably 30 mol %.

Accordingly, the amount of the component represented by the formula (A) is preferably 5 mol % or more and 45 mol % or less, more preferably 7 mol % or more and 40 mol % or less, still more preferably 10 mol % or more and 35 mol % or less, and particularly preferably 15 mol % or more and 30 mol % or less.

The component represented by (A) is preferably a component derived from 6,6'-(ethylenedioxy)di-2-naphthoic acid, 6,6'-(trimethylenedioxy)di-2-naphthoic acid, or 6,6'-(butylenedioxy)di-2-naphthoic acid. Among these, a component having an even number of the carbon atoms of $R^4$ in the formula (A) is preferable. Particularly, a component derived from 6,6'-(ethylenedioxy)di-2-naphthoic acid is preferable.

The copolymer polyester (1) preferably contains, as the dicarboxylic acid component, the component represented by the formula (A) in a specific amount. By containing the component represented by the formula (A) in a specific amount, the difference between the refractive index nY in Y direction and the refractive index nZ in Z direction in the first layer of the stretched film becomes small. In addition, as described later, polarization performance can be still more enhanced. Also, the hue shift is not easily developed in the polarized light that enters at an oblique incident angle.

Examples of the naphthalene dicarboxylic acid component include 2,6-naphthalene dicarboxylic acid, 2,7-naphthalene dicarboxylic acid, a component derived from the combination thereof, or a component derived therefrom. Particularly, preferable examples include 2,6-naphthalene dicarboxylic acid or a component derived therefrom.

The lower limit of the amount of the naphthalene dicarboxylic acid component is preferably 55 mol %, more preferably 60 mol %, still more preferably 65 mol %, and particularly preferably 70 mol %. The upper limit of the amount of the naphthalene dicarboxylic acid component is preferably 93 mol %, more preferably 90 mol %, and still more preferably 85 mol %.

Accordingly, the amount of the naphthalene dicarboxylic acid component is preferably 55 mol % or more and 95 mol % or less, more preferably 60 mol % or more and 93 mol % or less, still more preferably 65 mol % or more and 90 mol % or less, and particularly preferably 70 mol % or more and 85 mol % or less.

When the ratio of the naphthalene dicarboxylic acid component is below the lower limit, amorphous character becomes enhanced and the difference between the refractive index nX in X direction and the refractive index nY in Y direction in the stretched film becomes smaller, so that sufficient reflection performance for P-polarized light component is not attained in some cases. When the amount of the naphthalene dicarboxylic acid component is above the upper limit, the ratio of the component represented by the formula (A) becomes relatively smaller and the difference between the refractive index nY in Y direction and the refractive index nZ in Z direction in the stretched film becomes larger, so that the hue shift is developed in the polarized light that enters at an oblique incident angle, in some cases.

In this way, by using the polyester containing a naphthalene dicarboxylic acid component, a high refractive index can be exhibited in X direction, and at the same time, a high birefringent performance in the uniaxial alignment is achievable.

Diol Component

As the diol component (ii) that composes the copolymer polyester (1) in the present invention, when a diol component having an alkylene group having 2 to 10 carbon atoms is contained in an amount of 90 mol % or more and 100 mol % or less, uniaxial alignment is enhanced and thus preferable. Here, the amount of the diol component is based on the total mol number of the diol components.

The amount of the diol component is more preferably 95 mol % or more and 100 mol % or less, and still more preferably 98 mol % or more and 100 mol % or less.

Examples of the alkylene group include an ethylene group, a propylene group, an isopropylene group, a tetramethylene group, a hexamethylene group, an octamethylene group and the like. Among these, ethylene glycol, trimethylene glycol, tetramethylene glycol, cyclohexane dimethanol and others are preferably cited. Ethylene glycol is particularly preferable.

Copolymer Polyester (1)

As a preferable embodiment of the copolymer polyester (1) in the present invention, in particularly preferable polyester, the naphthalene dicarboxylic acid component is derived from 2,6-naphthalene dicarboxylic acid, the dicarboxylic acid component represented by the formula (A) is derived from 6,6'-(ethylenedioxy) di-2-napthoic acid, and the diol component is ethylene glycol.

A component such as the naphthalene dicarboxylic acid component and the component represented by the formula (A), having aromatic rings mainly has an effect of attaining a high refractive index in X direction through stretching. Furthermore, when the component represented by the formula (A) is included, the refractive index in Y direction tends to be easily lowered by stretching. Specifically, the component represented by the formula (A) has a molecular structure in which two aromatic rings are bonded to each other by an ether bonding through an alkylene chain, so that these aromatic rings tend to easily rotate in a direction different from the plane direction and that the refractive index in Y direction of the first layer tends to be easily lowered by stretching.

On the other hand, because the diol component of the copolymer polyester (1) in the present invention is aliphatic, the effect of the diol component on the refractive index characteristics of the first layer is less as compared with the dicarboxylic acid component of the present invention.

The copolymer polyester (1) has an intrinsic viscosity of preferably 0.4 dL/g to 3 dL/g, more preferably 0.4 dL/g to 1.5 dL/g, and particularly preferably 0.5 dL/g to 1.2 dL/g, as measured by using a mixed solvent of p-chlorophenol/1,1,2,2-tetrachloroethane (40/60 by weight ratio) at 35° C.

The melting point of the copolymer polyester (1) is preferably in a range of 200° C. to 260° C., more preferably 205° C. to 255° C., and still more preferably 210° C. to 250° C. The melting point can be determined by measurement using DSC.

When the melting point of the polyester is above the upper limit, upon molding through melt extrusion, fluidity becomes degraded and extrusion may become non-uniform in some cases. On the other hand, when the melting point is below the lower limit, although good film formability is attained, mechanical properties of the polyester become easily damaged and the refractive index characteristics of the present invention is difficult to be exhibited.

In general, a copolymer has a lower melting point as compared with a homopolymer, and the mechanical strength thereof has a tendency of being lowered. However, in the case of a copolymer containing the component of the formula (A) and the naphthalene dicarboxylic acid component, the copolymer exhibits such excellent performances, wherein it exhibits a mechanical strength comparable to that of a homopolymer containing only the naphthalene dicarboxylic acid component or a homopolymer containing only the component of the formula (A), although the melting point is lower than that of the homopolymers.

The glass transition temperature (hereinafter, referred to as Tg in some cases) of the copolymer polyester (1) is in a range of preferably 80° C. to 120° C., more preferably 82° C. to 118° C., and still more preferably 85° C. to 118° C. When Tg is in this range, a film having excellent heat resistance and dimension stability is obtainable. The melting point and the glass transition temperature are adjustable by the kinds and copolymerization amount of copolymer components, regulation of dialkylene glycol that is a byproduct, and others.

The copolymer polyester (1) containing the naphthalene dicarboxylic acid component and the component represented by the formula (A) may be produced in accordance with a method described, for example, in page 9 of International Publication No. WO 2008/153188.

Refractive Index Characteristics of Copolymer Polyester (1)

Figure 2:
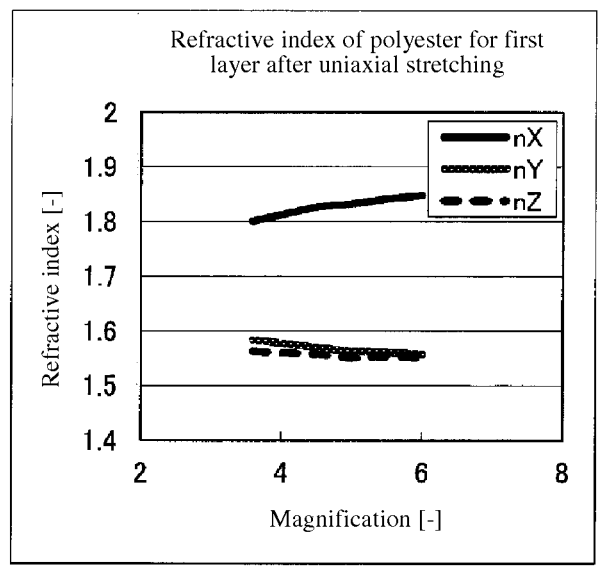
FIG. 2 shows, in accordance with the equation (A), refractive indexes of copolymer PEN that uses a component derived from 6-6'-(ethylenedioxy)di-2-naphthoic acid in a stretched direction (X direction) after uniaxially stretching, in a direction perpendicular to the stretching direction (Y direction), and in a thickness direction (Z direction); they are represented by nX, nY, and nZ, respectively.
Figure 3:
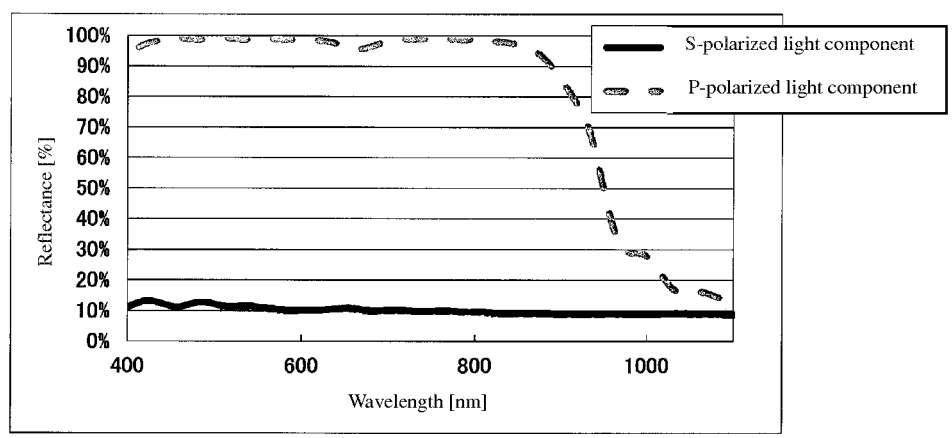
FIG. 3 shows an example of graphs that represent, against wavelength, the reflectance of polarized light component (P-polarized light component) parallel to the incident plane including stretched direction (X direction) and the reflectance of polarized light component (S-polarized light component) perpendicular to the incident plane including the stretched direction (X direction), wherein the film plane of the uniaxially stretched multi-layer laminate film of the present invention is selected as a reflection plane.

An example of changes in the refractive index in each direction is shown in FIG. 2, where the copolymer PEN is stretched uniaxially in X direction, wherein the PEN is obtained by using a component derived from 6,6'-(ethylenedioxy)di-2-naphthoic acid represented by the formula (A) as a preferable embodiment of the copolymer polyester (1) of the present invention. As shown in FIG. 2, the refractive index nX in X direction has a tendency of being increased by stretching. Both refractive index nY in Y direction and refractive index nZ in Z direction have a tendency of being lowered by stretching. Furthermore, regardless of the stretching ratio, the difference between the refractive index nY and the refractive index nZ becomes extremely small.

When the copolymer polyester (1) containing the aforementioned specific copolymer component is used for the first layer and uniaxial stretching is applied, the refractive index nX in X direction of the first layer exhibits a high refractive index characteristic of 1.80 to 1.90. When the refractive index in X direction in the first layer is in the above range, the difference in the refractive index with respect to the second layer becomes large, and sufficient reflective polarization performance can be exhibited.

In addition, the difference between the refractive index nY in Y direction after uniaxial stretching and the refractive index nZ in Z direction after uniaxial stretching is preferably 0.05 or less, more preferably 0.03 or less, and particularly preferably 0.01 or less. When the difference between these two directions is extremely small, an effect of disappearance of the hue shift is exhibited even through polarized light enters at an oblique incident angle.

As opposed to the above, when the polyester that composes the first layer is polyethylene-2,6-naphthalene dicarboxylate (homo PEN), as shown in FIG. 1, regardless of the stretching ratio in the uniaxial direction, the refractive index nY in Y direction remains constant and shows no lowering, while the refractive index nZ in Z direction lowers as the stretching ratio in uniaxial direction increases. Accordingly, the difference between the refractive index nY in Y direction and the refractive index nZ in Z direction becomes large, and the hue shift becomes easily developed when polarized light enters at an oblique incident angle.

Second Layer

Copolymer Polyester in the Second Layer

In the present invention, the second layer of the uniaxially stretched multi-layer laminate film is composed of a copolymer polyester and is an optically isotropic layer having an average refractive index of 1.50 or more and 1.60 or less.

The average refractive index of the second layer is specified as: the copolymer polyester that composes the second layer is fused and extruded through a die to form an unstretched film, which is then uniaxially stretched by 5 times at 120° C. to obtain a uniaxially stretched film; refractive indexes at a wavelength of 633 nm are measured in each direction of X, Y, and Z of the resulting film using a prism coupler manufactured by Metricon Co., Ltd.; and the average value thereof is specified as the average refractive index.

Optical isotropy means that difference in refractive indexes between any two directions among X, Y, and Z directions is 0.05 or less and preferably 0.03 or less.

The average refractive index of the copolymer polyester that composes the second layer is preferably 1.53 or more and 1.60 or less, more preferably 1.55 or more and 1.60 or less, and still more preferably 1.58 or more and 1.60 or less. When the second layer has an average refractive index in the above range and is found to be an optically isotropic material as evidenced by the small differences in the refractive indexes among any of directions when stretched, refractive index characteristics can be obtained, the difference in refractive indexes in X direction between the first layer and the second layer, after stretching is large and at the same time the difference in the interlayer refractive indexes in Y direction is small. Accordingly, polarization performance can be highly enhanced. In addition, when the component represented by the formula (A) is used as a copolymer component of the first layer, not only the aforementioned characteristics of the interlayer refractive index differences in X and Y directions, but also the refractive index differences in Z direction are reduced. Furthermore, the hue shift caused by oblique incident angle is suppressed.

The second layer of the present invention may contain, within a range of not causing any effect on the polarization degree and transmission of S-polarized light in the present invention, a thermoplastic resin other than the copolymer polyester in a range of 10 wt % or less on the basis of the weight of the second layer as a second polymer component.

The copolymer polyester of the second layer in the present invention has a glass transition temperature of preferably 90° C. or higher, still more preferably 90° C. or higher and 150° C. or lower, and particularly preferably 90° C. or higher and 120° C. or lower. When the copolymer polyester of the second layer has a glass transition temperature below the lower limit, heat resistance at 90° C. may not be sufficient in some cases. When a step such as heat treatment around this temperature is involved, an increase in haze occurs because of crystallization or embrittlement of the second layer, which may be accompanied by decrease in the polarization degree. On the other hand, when the copolymer polyester of the second layer has a glass transition temperature that is too high, birefringence caused by stretching may be developed in the polyester of the second layer upon stretching. In this case, the difference in refractive indexes between the first and second layers becomes small in the stretching direction and the reflective performance may be reduced.

Of the copolymer polyester that has the aforementioned refractive index characteristics, from the viewpoint of a complete absence of the haze increase caused by crystallization in a heat treatment at 90° C. for 1000 hours, an amorphous copolymer polyester is preferable. Here, amorphous means that crystal fusion heat determined by the differential scanning calorimetry (DSC) where a temperature rise rate at 20° C./minute is employed is less than 0.1 mJ/mg.

Examples of the amorphous copolymer polyester that has the aforementioned refractive index characteristics include, preferably, copolymer polyethylene terephthalate, copolymer polyethylene naphthalene dicarboxylate, and a blend thereof. Of these, copolymer polyethylene terephthalate is preferable. Of the copolymer polyethylene terephthalate, a preferable copolymer polyethylene terephthalate contains, as a copolymer component, isophthalic acid, naphthalene dicarboxylic acid, or at least one component selected from alicyclic diols such as spiroglycol, tricyclodecane dimethanol, and cyclohexane dimethanol.

Among these, as the copolymer component, copolymer polyester containing an alicyclic diol is preferable. Particularly, copolymer polyethylene terephthalate containing an alicyclic diol is preferable as the copolymer component.

The alicyclic diol used as the copolymer component of the copolymer polyester is preferably at least one kind selected from the group consisting of spiroglycol, tricyclodecane dimethanol, and cyclohexane dimethanol. In addition to these alicyclic diols, in order to attain the aforementioned glass transition temperature while the relation to the refractive index of the first layer is adjusted, an acid component including isophthalic acid, terephthalic acid, and 2,6-naphthalene dicarboxylic acid may be used as the copolymer component besides the main acid component.

As the copolymer polyester of the second layer, particularly, a preferable polyester contains, as the main component, an ethylene terephthalate component formed by copolymerization of 2,6-naphthalene dicarboxylic acid and spiroglycol. Spiroglycol is preferable from the viewpoint of having a larger crystal binding force as compared with other alicyclic diol components such as cyclohexane dimethanol and suppressing the increase in haze caused by crystallization of the second layer in the occasion of long time heat treatment at 90° C. for 1000 hours.

In addition, as the preferable copolymer polyester for the second layer other than the copolymer polyester containing aliphatic diol, there is mentioned a copolymer polyester containing one or two kinds of aromatic dicarboxylic acid as the copolymer component. Copolymer polyethylene terephthalate containing naphthalene dicarboxylic acid as the copolymer component is preferable. The copolymerization amount thereof is adjusted such that the glass transition temperature becomes 90° C. or higher.

Note that, when alicyclic diol is contained as the copolymer component, the relation with the refractive index of the first layer polyester is more easily adjusted.

When the copolymer component that composes the copolymer polyester of the second layer is only alicyclic diol, spiroglycol is preferable. The amount used in the copolymerization is preferably 20 mol % to 45 mol %. When the copolymer component that composes the copolymer polyester of the second layer consists of alicyclic diol and other copolymer components, preferably, alicyclic diol is 10 mol % to 30 mol % and the other copolymer components are 10 mol % to 60 mol %.

Here, the copolymerization amount of the copolymer polyester that composes the second layer in the present invention is explained by taking copolymer polyethylene terephthalate for example. The copolymerization amount is represented in terms of a proportion of minor copolymer components with respect to the repeating units of the polyester that compose the second layer as 100 mol %. The minor components are represented by the total amount of components except the ethylene glycol component in the diol component and the terephthalic acid component in the dicarboxylic acid component.

In addition, the copolymer polyester of the second layer may contain, within a range of 10 mol % or less, as a copolymer component besides the aforementioned components: an aliphatic dicarboxylic acid such as adipic acid, azelaic acid, sebacic acid, decane dicarboxylic acid and the like; an acid component including alicyclic dicarboxylic acid such as cyclohexane dicarboxylic acid and the like; and a glycol component including aliphatic diol such as butane diol, hexane diol and the like.

The copolymer polyester of the second layer has an intrinsic viscosity as measured using an o-chlorophenol solution at 35° C. of preferably 0.55 dL/g to 0.75 dL/g and more preferably 0.60 dL/g to 0.70 dL/g.

In the copolymer polyester that has the aforementioned glass transition temperature, an alicyclic diol component and the like is used as the copolymer component, so that tearing strength particularly in unstretched direction becomes easily degraded. Therefore, by adjusting the intrinsic viscosity of the copolymer polyester within the aforementioned range, resistance against tearing may be enhanced. When the intrinsic viscosity of the copolymer polyester is below the lower limit, the resistance against tearing may become insufficient. The intrinsic viscosity of the copolymer polyester is preferably higher from the viewpoint of the resistance against tearing. However, when the intrinsic viscosity exceeds the upper limit, difference in melt viscosity from the aromatic polyester of the first layer become larger, which tends to cause non-uniformity in the thickness of each layer.

Buffer Layer, Intermediate Layer

The uniaxially stretched multi-layer laminate film of the present invention contains, inside of the alternately laminated configuration of the first and second layers, an intermediate layer having a thickness of 2 μm or more and 30 μm or less besides the first and second layers. While the intermediate layer is sometimes referred to as an inside thick film layer in the present invention, it is referred to a thick film layer disposed inside of the alternately laminated configuration. In the present invention, in a preferable method, thick film layers (thickness conditioning layers, referred to as buffer layers in some cases) are formed on both sides of an alternate laminate consisting of 300 or less layers in an initial step of producing a multi-layer laminate film, and then the number of lamination is increased by doubling. In this case, two buffer layers are laminated with each other to form the intermediate layer.

Including the intermediate layer having such thickness as a part of the alternately laminated configuration of the first and second layers makes it easier to adjust uniformly the thickness of each layer that composes the first and second layers, without bringing about any effect on the polarization function. The intermediate layer having such thickness may have the same composition with either of the first layer and the second layer or may have a composition that partly contains the same composition. The layer thickness is so large that it does not contribute to the reflective characteristics. On the other hand, transmitted polarized light is sometimes affected, so that, when particles are included in the layer, they are preferably included in a range of the particle concentration described in the explanation of particles.

The thickness of the intermediate layer is preferably 2 μm or more and 25 μm or less, more preferably 3 μm or more and 20 μm or less, still more preferably 4 μm or more and 20 μm or less, and particularly preferably 5 μm or more and 15 μm or less. When the thickness of the intermediate layer is below the lower limit, the layer structure of the alternately laminated configuration portion tends to be easily collapsed, and the reflective performance may be reduced. Also, when the visible light absorbent of the present invention is used in the intermediate layer, the intermediate layer of the present invention is not able to exhibit sufficient absorption of multiple reflections. On the other hand, when the thickness of the intermediate layer is above the upper limit, the whole thickness of the uniaxially stretched multi-layer laminate film becomes thicker after lamination, which makes it difficult to attain space-saving when used as a polarizing plate of a thin-type liquid crystal display device. In addition, when a plurality of intermediate layers is included in the uniaxially stretched multi-layer laminate film, the thickness of each intermediate layer is preferably within the aforementioned range.

In relation to the aforementioned method of producing the intermediate layer, the outermost layer of the uniaxially stretched multi-layer laminate film serves as the buffer layer. However, an effect of absorbing multiple reflections brought about by the intermediate layer is exhibited by including a visible light absorbent in the intermediate layer disposed inside the multi-layer structure. Namely, even though a visible light absorbent is included only in the outermost layer of the multi-layer structure, since the transmittance for P-polarized light and the transmittance for S-polarized light degrade at the same rate, the value of polarization degree (P) is not changed. For this reason, considering the method of producing the multi-layer laminate film, along with the intermediate layer of the present invention, a layer having the same composition may be disposed in the outermost layer of the multi-layer structure. In this case, however, the outermost layer hardly brings about further enhancement of polarization degree. The effect is brought about mostly by the intermediate layer.

Regarding the thermoplastic resin used for the intermediate layer having the aforementioned thickness, a resin that is different from the first layer or the second layer may be used when the resin is allowed to be included in the multi-layer structure by using the method of producing the uniaxially stretched multi-layer laminate film of the present invention. However, considering interlayer adhesion, a resin having the same composition with any of the first layer and the second layer is preferable, or a resin having a composition that partly contains the same composition may be allowed.

The method of forming the intermediate layer is not particularly limited, however, for example, one inside thick film layer (intermediate layer) may be formed as: thick film layers (buffer layer) are formed on both sides of an alternately laminated body that has 300 or less layers and is in a step before performing doubling in the method of producing the uniaxially stretched multi-layer laminate film to be described later; the resulting assembly is divided into two parts by using a branching block called as a layer doubling block; and then they are laminated again. By using the same procedure, through three branching or four branching, a plurality of intermediate layers may also be formed.

Visible Light Absorbent

The uniaxially stretched multi-layer laminate film of the present invention includes, in the first layer, the second layer, both first and second layers, or the intermediate layer thereof, a visible light absorbent that has a weight loss of less than 10% after it is kept at 300° C. for 1 hour in an amount of 200 ppm or more and 2500 ppm or less on the basis of the weight of the layer.

Regarding the effect of suppressing multiple reflections provided by the visible light absorbent of the present invention, suppression mechanism differs depending on the layer to which the absorbent is added.

When a visible light absorbent that has high heat resistance is added in a minute amount to an intermediate layer having a specified thickness disposed inside the alternately laminated portion of the uniaxially stretched multi-layer laminate film and having no effect on the optical interference, multiple reflection components generated inside the multi-layer structure are effectively absorbed and high transmittance of transmitted polarized light components is maintained. Accordingly, an extremely high polarization degree of 99.5% or more is attained by the uniaxially stretched multi-layer laminate film by itself.

Here, a mechanism for generating multiple reflection components is described. In a reflective polarizing film that has a multi-layer structure, because of the mechanism of generating the reflection property thereof, a small portion of the component that is in principle to be reflected as P-polarized light changes the polarizing direction due to multiple reflections generated inside the multi-layer structure, and is transmitted as a light leakage component through the film. In order to suppress the light leakage of P-polarized light generated by multiple reflections, an intermediate layer having a specified thickness and having no effect on the optical interference is disposed inside the multi-layer structure, wherein a visible light absorbent that has a high heat resistance is included in a specified amount. Accordingly, the light leakage component generated by multiple reflections can be effectively absorbed.

Furthermore, when a visible light absorbent having an excellent heat resistance is added in a minute amount to the first layer, the second layer, or both first and second layers that compose the alternately laminated portion of the uniaxially stretched multi-layer laminate film of the present invention, generation of multiple reflections itself that brings about generation of light leakage components can be suppressed and a high transmission of transmitted polarized light components is secured. Therefore, an extremely high polarization degree of 99.5% or more is attained by the uniaxially stretched multi-layer laminate film by itself.

In the present invention, generation of multiple reflections itself is effectively suppressed by including the visible light absorbent having the characteristics of the present invention in the first layer, the second layer, or both first and second layers. Accordingly, the polarization degree is enhanced more efficiently as compared with a method in which multiple reflections generated in the multi-layer portion are absorbed using the visible light absorbent in the intermediate layer.

When the visible light absorbent is included in a minute amount in the first layer, the second layer, or both first and second layers, for example, among the layers that compose the first layer, generation of multiple reflections itself may be eliminated when 50% or more thereof, more preferably 80% or more, still more preferably 90% or more, particularly preferably 95% or more, and most preferably all of the layers include the visible light absorbent.

Similarly, when the visible light absorbent is included in the second layer, the visible light absorbent is included in preferably 50% or more of the layers that compose the second layer, more preferably 50% or more, still more preferably 90% or more, particularly preferably 95% or more, and most preferably all of the layers. Furthermore, when the visible light absorbent is included in both first and second layers, the same amount as above is preferable with respect to the total layers that compose the first and second layers.

In addition, when the visible light absorbent is included in an amount of 200 ppm or more and 2500 ppm or less on the basis of the weight of the layer, multiple reflections may be suppressed. Within the range of the amount of the visible light absorbent to be included, the average transmission (Ts) of S-polarized light in a wavelength range of 400 nm to 800 nm does not suffer from any effect, and thus the polarization degree can be highly enhanced.

Regarding the amount of the visible light absorbent to be included, the lower limit is preferably 300 ppm, more preferably 400 ppm, and still more preferably 500 ppm. The upper limit is preferably 2200 ppm, more preferably 2000 ppm, still more preferably 1500 ppm, and particularly preferably 1200 ppm.

When the amount of the visible light absorbent to be included is below the lower limit, sufficient effect of suppressing multiple reflections is not attained. On the other hand, when the amount of the visible light absorbent to be included is above the upper limit, transmission of S-polarized light is lowered, and thus the performance of enhancing brightness decreases when used in liquid crystal display devices.

In addition, as the visible light absorbent used in the present invention, a visible light absorbent having excellent stability against heating is used, wherein the weight loss is less than 10% after the absorbent is kept at 300° C. for 1 hour. By using the visible light absorbent having the excellent stability against heating and a coextrusion process of producing conventional uniaxially stretched multi-layer laminate films, a uniaxially stretched multi-layer laminate film having a high polarization performance with a polarization degree of 99.5% or more, which is comparable to an absorption type polarizing plate, can be obtained by adopting a configuration simpler than a conventional method of producing hybrid polarizers in which an absorption layer is prepared in a separate step and it is subsequently bonded together with a reflective polarizer. As the aforementioned visible light absorbent, the one that has a weight loss of 5% or less after it is kept at 300° C. for 1 hour is preferable, because it exhibits more excellent stability against heating in the coextrusion step. The one having a weight loss of 3% or less is more preferable.

As long as the visible light absorbent has the aforementioned heat resistant characteristics, any kind of visible light absorbents may be usable. For example, at least one kind selected from the group consisting of inorganic pigments, organic dyes, and organic pigments is preferable.

Specific examples thereof include: organic dyes or organic pigments such as phthalocyanine-based, azo-based, condensed azo-based, azolake-based, anthraquinone-based, perylene-perinone-based, indigo-thioindigo-based, isoindolinone-based, azomethineazo-based, dioxazine-based, quinacridone-based, aniline black-based, triphenylmethane-based families and the like; and inorganic pigments such as carbon black-based, titanium oxide-based, iron oxide-based, iron hydroxide-based, chromium oxide-based, spinel-type sintered-based, chromate-based, chrome vermilion-based, iron blue-based, aluminum powder-based, bronze powder-based families and the like.

These dyes or pigments may be in any form. They may be subjected to various dispersion treatments by various known methods.

Among these visible light absorbents, from the viewpoint of suppressing coloring of S-polarized transmitted light, absorbents that are conditioned in black or gray are preferable and more preferably in neutral gray. As the inorganic pigments, carbon black, iron oxide and the like are preferable. As the organic dyes or organic pigments, a preferable absorbent includes a mixture of a plurality of dyes or pigments such as anthraquinone-based, phthalocyanine-based families and the like and is conditioned in neutral gray.

Furthermore, among these, an absorbent having a high dispersability in a polyester is more preferable. In the case of a pigment family that is insoluble in the polyester, an absorbent having an average particle size of 0.05 µm to 0.5 µm is preferably used. More preferable particle size is 0.01 µm to 0.3 µm, still more preferable is 0.01 µm to 0.1 µm, and particularly preferable is 0.01 µm to 0.05 µm. By using, as the visible light absorbent, an organic dye that has an excellent heat resistance and is easy to be dispersed in the polyester or a pigment that has the aforementioned average particle size, the visible light absorbent is dispersed uniformly in the film and the polarization performance is still more enhanced.

UV Light Absorbent

The uniaxially stretched multi-layer laminate film of the present invention contains, besides a layer derived from the second layer and/or the intermediate layer, preferably, a UV light absorbent that has a weight loss of less than 3% after it is kept at 300° C. for 1 hour in an amount of 0.2 wt % to 5 wt %. More preferably, the outermost layer is a layer derived from the second layer or the intermediate layer and is disposed on the side of the surface layer in a manner that the layer is closer to the surface layer than the first layer. In addition, more preferably, the outermost layer is a layer derived from the intermediate layer (serving as a thickness conditioning layer in the present invention). Use of the same resin composition for the layer derived from the intermediate layer and the second layer is simple and more preferable from the viewpoint of the production method.

By using the aforementioned UV light absorbent in a layer derived from the second layer and/or intermediate layers, the polyester of the first layer that has an absorption wavelength longer than the polyesters of these layers is effectively prevented from degradation caused by UV light. Accordingly, when the uniaxially stretched multi-layer laminate film of the present invention is used as a polarizing plate disposed adjacent to a liquid crystal cell, liquid crystal molecules within the liquid crystal cell can be sufficiently protected from UV light.

In the case of using the UV light absorbent, by using a UV light absorbent having an excellent heat resistance at 300° C., when a polyester film containing a PEN-family resin that has a high film forming temperature is subjected to a film-forming process, process contamination and bleeding out from the film may be suppressed. When a UV light absorbent that has a weight loss of 3% or more after it is kept at 300° C. for 1 hour is used in an extrusion process of PEN-family polyester films where high film-forming temperature is used, decomposition, gasification, or sublimation occurs, which may cause defects in films or contamination in the extrusion step by decomposition products. In addition, even after the films have been produced, for example, when durability test at 90° C. for 1000 hours is performed, the UV light absorbent may bleed out and the films may be bleached. The weight loss of the UV light absorbent after it is kept at 300° C. for 1 hour is more preferably less than 1%.

Furthermore, the UV light absorbent used in the present invention preferably has an absorption peak in a UV light range of 320 nm to 400 nm. By using a UV light absorbent that has the aforementioned characteristics, the transmission of S-polarized light at 380 nm becomes less than 5% in the uniaxially stretched multi-layer laminate film, as described in the UV light transmission characteristics.

The UV light absorbent that has the aforementioned heat resistance and UV light absorption performance includes a triazine compound represented by the flowing formula (B) and a benzoxazinone compound represented by the following formula (C).

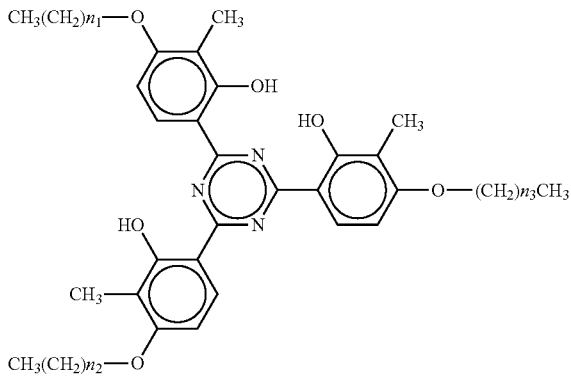

(B)

In the formula (B), each of n1, n2, and n3 represents an integer of 4 to 10.

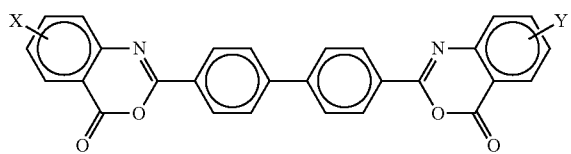

(C)

In the formula (C), each of X and Y represents respectively a hydrogen atom or an alkyl group having 1 to 4 carbon atoms.

The amount of the UV light absorbent is preferably 0.2 wt % to 5 wt % more preferably 0.3 wt % to 3 wt %, and still more preferably 0.5 wt % to 1 wt % based on the weight of the layer in which the absorbent is included. When the amount of the UV light absorbent is below the lower limit, UV light absorption performance may not be sufficiently exhibited. Also, films may be colored or protection of liquid crystal molecules inside of liquid crystal cells may not be sufficient. When the amount of the UV light absorbent is above the upper limit, the absorbent may not be dissolved in the polymer, and transparency may be lost or decomposition products that are generated in a small amount may bring about process contamination, in spite of excellent heat resistance at 300° C.

In the case of using additionally the UV light absorbent in the present invention, the visible light absorbent of the present invention is added to the first layer, the UV light absorbent of the present invention is added to the layer derived from the second layer and/or intermediate layer. In addition, among the layers containing the visible light absorbent, by making a configuration in which the layer disposed in the outermost layer is disposed further outside of the first layer, the effect of suppressing multiple reflections due to the visible light absorbent and the effect of suppressing degradation caused by UV light are exhibited in the most effective way.

Other Additives

The uniaxially stretched multi-layer laminate film of the present invention preferably contains, in order to improve film winding-up performance, inactive particles that have an average particle size of 0.01 µm to 2 µm in at least one of the outermost layers in an amount of 0.001 wt % to 0.5 wt % on the basis of the weight of the layer. When the average size of the inactive particles is less than the lower limit value or the amount included is less than the lower limit value, the effect of improving the winding-up performance of the stretched multi-layer film may become insufficient. On the other hand, when the amount of the inactive particles included is more than the upper limit value or the average size of the particles is more than the upper limit value, the optical properties of the stretched multi-layer film may be degraded. The average particle size of the inactive particles is in a range of preferably 0.02 µm to 1 µm and particularly preferably 0.1 µm to 0.3 µm. Further, the amount of the inactive particles is in a range of preferably 0.02 wt % to 0.2 wt %.

Examples of the inactive particles that are contained in the uniaxially stretched multi-layer laminate film include: inorganic inactive particles such as silica, alumina, calcium carbonate, calcium phosphate, kaolin, talc and the like; and organic inactive particles such as silicone, cross-linked polystyrene, styrene-divinylbenzene copolymer and the like. The form of the particles is not particularly limited as long as the form is conventionally used such as aggregated or spherical.

The inactive particles may be contained not only in the outermost layer but also in a layer composed of the same resin as the outermost layer. For example, the inactive particles may be contained in at least one of the first and second layers. Alternatively, a layer different from the first and second layers may be disposed as an outermost layer. Furthermore, when a heat seal layer is disposed, the inactive particles may be contained in the heat seal layer.

Laminate Configuration of Uniaxially Stretched Multi-Layer Laminate Film

Number of Lamination

In the uniaxially stretched multi-layer laminate film of the present invention, the aforementioned first and second layers are alternately laminated in a total lamination number of preferably 251 layers or more. When the number of lamination is less than 251 layers, regarding an average reflection characteristic of a polarized light component parallel to an incidence plane including stretched direction (X direction), a specified average reflection over a wavelength range of 400 nm to 800 nm may not be attained.

The upper limit value of the number of lamination is preferably 2001 layers or less considering productivity and handling property of films. However, as long as a target average reflection characteristic is attained, considering productivity and the handling property, the number of lamination may be further reduced. For example, 1001 layers, 501 layers, or 301 layers are acceptable.

Thickness of Each Layer

The thickness of each layer in the first and second layers is preferably 0.01 µm or more and 0.5 µm or less. The thickness of each layer in the first layer is preferably 0.01 µm or more and 0.1 µm or less. The thickness of each layer in the second layer is preferably 0.01 µm or more and 0.3 µm or less. The thickness of each layer is obtained on the basis of pictures taken by using a transmission electron microscope.

When the uniaxially stretched multi-layer laminate film of the present invention is used as a reflective polarizing plate for a liquid crystal display device, the reflection wavelength range is preferably from visible light region to near-infrared light region. By way of specifying the thickness of each layer in the first and second layers within the aforementioned range, light in the aforementioned wavelength range is allowed to be reflected selectively by interlayer optical interferences. On the other hand, when the thickness of the layer is more than 0.5 µm, the reflection range is in infrared light region. When the thickness is less than 0.01 µm, the polyester portion absorbs light and the reflective performance is not attained.

Ratio Between Maximum Layer Thickness and Minimum Layer Thickness

In the uniaxially stretched multi-layer laminate film, the ratio between the maximum layer thickness and the minimum layer thickness in each of the first layer and the second layer is preferably 2.0 or more and 5.0 or less, more preferably 2.0 or more and 4.0 or less, still more preferably 2.0 or more and 3.5 or less, and particularly preferably 2.0 or more and 3.2 or less. The ratio of layer thicknesses is represented, specifically, by the ratio of the maximum layer thickness to the minimum layer thickness. The maximum layer thickness and the minimum layer thickness in each of the first layer and the second layer are obtained on the basis of pictures taken by using a transmission electron microscope.

In a multi-layer laminate film, a wavelength of the light reflected by the film is determined by the difference in refractive indexes between layers, number of layers, and thicknesses of layers. When laminated layers of the first and second layers each have a uniform thickness, only a specific wavelength is reflected. If this is the case, regarding the average reflection characteristic of a polarized light component parallel to incidence plane including the stretched direction (X direction), the average reflection may not be enhanced uniformly over a wide wavelength range of 400 nm to 800 nm. For this reason, layers that have different thicknesses from each other are preferably used.

On the other hand, when the ratio between the maximum layer thickness and the minimum layer thickness is above the upper limit value, the reflection range becomes wider than 400 nm to 800 nm, which may bring about lowering in the reflection of a polarized light component parallel to incidence plane including the stretched direction (X direction).

The thickness of each of the first and second layers may change stepwise or continuously. The change in each of the laminated layers of the first and second layers as described above enables light reflection in a wider wavelength range.

In the uniaxially stretched multi-layer laminate film, a method of laminating multi-layer structure is not particularly limited, but, for example, there may be mentioned a method of using a multi-layer feed block apparatus, wherein the first layer in which the polyester for the first layer is branched into 137 layers and the second layer in which the polyester for the second layer is branched into 138 layers are alternately laminated and the flow channel thereof changes continuously by 2.0 to 5.0 times.

Ratio of Average Layer Thicknesses Between First and Second Layers

In the uniaxially stretched multi-layer laminate film, the ratio of the average layer thickness of the first layer with respect to the average layer thickness of the second layer is preferably in a range of 0.5 time or more and 2.0 times or less. The lower limit value in the ratio of the average layer thickness of the first layer with respect to the average layer thickness of the second layer is more preferably 0.8. The upper limit value of the ratio in the average layer thickness of the first layer with respect to the average layer thickness of the second layer is more preferably 1.5. The most preferable range is 1.1 or more and 1.3 or less.

By optimizing the ratio of the average layer thickness of the first layer with respect to the average layer thickness of the second layer, light leakage due to multiple reflections can be minimized. The ratio of the thickness thus optimized is referred to a thickness at which the value represented by (refractive index of the first layer in stretched direction)×(average layer thickness of the first layer) and the value represented by (refractive index of the second layer in stretched direction)×(average layer thickness of the second layer) become equal. A preferable range of the ratio of the average layer thickness of the second layer with respect to the average layer thickness of the first layer is about 1.1 to about 1.3 in terms of refractive index characteristics of each layer according to the present invention.

Uniaxially Stretched Film

The uniaxially stretched multi-layer laminate film of the present invention is stretched in at least uniaxial direction in order to satisfy optical characteristics as a target reflective polarizing film. The uniaxially stretched film in the present invention includes not only a film stretched only in uniaxial direction but also a film that is stretched in biaxial direction and is more stretched in one direction. The uniaxially stretched direction (X direction) may be any of the longitudinal direction and the widthwise direction of the film. In the case of the film that is stretched in biaxial direction and more stretched in one direction, the direction (X direction) in which it is more stretched may be any of the longitudinal direction and the widthwise direction of the film. In a direction having a low stretching ratio, the stretching ratio is kept to be preferably about 1.05 to about 1.20 from the viewpoint of enhancing polarizing performance. In the case of the film stretched in biaxial direction and more stretched in one direction, "stretched direction" represents the more stretched direction in relation to polarization or refractive index.

As a stretching method, conventional stretching methods are usable, which include heat stretching using a bar heater, roll heat stretching, tenter stretching and the like. Considering reduction of scratches due to contact with rolls or considering the stretching speed, tenter stretching is preferable.

The film thickness of the uniaxially stretched multi-layer laminate film is preferably 15 μm or more and 200 μm or less and more preferably 50 μm or more and 180 μm or less.

Polarization Degree

The uniaxially stretched multi-layer laminate film of the present invention has a polarization degree of 99.5% or more, preferably 99.6% or more, more preferably 99.7%, and particularly preferably 99.9% or more, according to the expression given by the following equation (1).

$$\text{Polarization degree}(P) = \{(Ts-Tp)/(Tp+Ts)\} \times 100 \qquad (1)$$

In the equation (1), Tp represents an average transmittance for P-polarized light in a wavelength range of 400 nm to 800 nm and Ts represents an average transmittance for S-polarized light in a wavelength range of 400 nm to 800 nm.

In the uniaxially stretched multi-layer laminate film in which the film plane is selected as a reflection plane, the P-polarized light in the present invention is defined as a polarized light component parallel to an incident plane that includes the uniaxially stretched direction (X direction). In the uniaxially stretched multi-layer laminate film in which the film plane is selected as a reflection plane, the S-polarized light in the present invention is defined as a polarized light component perpendicular to an incident plane that includes the uniaxially stretched direction (X direction).

In the present invention, the polarization degree is measured by using a polarization degree measurement device.

As the polarization degree specified by the above equation (1) is higher, transmission of reflected polarized light components is suppressed and transmittance of transmitted polarized light components in a direction perpendicular thereto is higher. That is, as the polarization degree increases, even a slight light leakage of the reflected polarized light components can be reduced. The uniaxially stretched multi-layer laminate film of the present invention has a polarization degree of 99.5% or more, and thus can be applied as a reflective polarizing plate by itself as a polarizing plate to a high contrast liquid crystal display device to which conventionally only an absorption type polarizing plate is applicable.

Requirements for attaining the above polarization degree characteristics in spite of a polyester film that has a multi-layer structure include: a specific polyester of the present invention is used both for a high refractive index layer (first layer) and a low refractive index layer (second layer) that compose a uniaxially stretched multi-layer laminate film; and at the same time, a specific amount of a visible light absorbent is contained in the first layer, the second layer, both first and second layers, or an intermediate layer.

S-Polarized Light Transmittance

The uniaxially stretched multi-layer laminate film of the present invention has an average transmittance Ts of S-polarized light in a wavelength range of 400 nm to 800 nm of 60% or more, preferably 70% or more, more preferably 75% or more, and still more preferably 80% or more.

The average transmittance for S-polarized light in the present invention represents an average transmittance in a wavelength range of 400 nm to 800 nm for a polarized light component perpendicular to an incident plane including uniaxially stretched direction (X direction) with respect to incident polarized light entering at an incident angle of zero degree, wherein the film plane of the uniaxially stretched multi-layer laminate film is selected as a reflection plane.

When the average transmittance for S-polarized light is below the lower limit, even though an optical recycle function is taken into consideration in the case of being used as a reflective polarizing plate, superiority in brightness enhancing effect becomes diminished compared with an absorption type polarizing plate. The optical recycle function is a characteristic of the reflective polarizing plate, in which reflected polarized light is not absorbed by a polarizing plate, but reflected to the side of a light source so as to use the light again efficiently.

Requirements for attaining the transmittance performance of S-polarized light component of the present invention include: the difference in refractive indexes between the first layer and the second layer in Y direction of the uniaxially stretched multi-layer laminate film of the present invention is 0.05 or less; and the amount of the visible light absorbent included does not exceed the upper limit value.

In addition, the uniaxially stretched multi-layer laminate film of the present invention has a transmittance for S-polarized light at 380 nm of preferably less than 5%, more preferably less than 3%, and still more preferably less than 1%. When the transmittance for S-polarized light at 380 nm is higher than the above range, in the case of using as a polarizing plate disposed adjacent to a liquid crystal cell, a function of protecting liquid crystal molecules inside the liquid crystal cell from UV light may not be sufficient.

Furthermore, the uniaxially stretched multi-layer laminate film of the present invention has a transmittance for S-polarized light at 400 nm of preferably 10% or more and less than 80% and more preferably 30% or more and less than 60%. If the transmittance for S-polarized light at 400 nm is below the lower limit, the hue of the film changes greatly in some cases.

In addition, the uniaxially stretched multi-layer laminate film of the present invention has a transmittance for S-polarized light at 420 nm of preferably 70% or more.

Interlayer Refractive Index Characteristics of First and Second Layers

The difference in X direction refractive indexes between the first layer and the second layer is preferably 0.10 to 0.45, more preferably 0.20 to 0.40, and particularly preferably 0.25 to 0.30. The difference in Y direction refractive indexes between the first layer and the second layer is preferably 0.05 or less. When the difference in X direction refractive indexes is in the above range, the reflective characteristics of P-polarized light component can be enhanced effectively, and a high refractive index can be obtained using less number of lamination. In addition, when the difference in Y direction refractive indexes is in the above range, the transmission characteristics of S-polarized light component can be enhanced efficiently.

Furthermore, the difference in Z direction refractive indexes between the first layer and the second layer is preferably 0.05 or less. When, in addition to Y direction, the difference in Z direction interlayer refractive indexes is also in the above range, the hue shift can be suppressed when polarized light enters at an oblique incident angle.

Average Reflectance

In the uniaxially stretched multi-layer laminate film of the present invention in which the film plane is selected as a reflection plane, a polarized light component parallel to an incident plane including the stretched direction (X direction)

of the uniaxially stretched film preferably has an average reflectance of 85% or more in a wavelength range of 400 nm to 800 nm with respect to incident polarized light entering at an incident angle of zero degree.

Since the average reflectance of P-polarized light component is high as described above, a high polarization performance of transmitting selectively S-polarized light while suppressing transmission of P-polarized light is exhibited and a high polarization degree of the present invention is attained. Therefore, without using an absorption type polarizing plate in combination, the uniaxially stretched multi-layer laminate film can be used by itself as a polarizing plate disposed adjacent to a liquid crystal cell. At the same time, P-polarized light perpendicular to the transmission axis is not absorbed by the uniaxially stretched multi-layer laminate film and is highly reflected, so that the film also exhibits a function as a brightness enhancing film that reuses the reflected light.

Further, in the uniaxially stretched multi-layer laminate film of the present invention in which the film plane is selected as a reflection plane, a polarized light component perpendicular to an incident plate including the stretched direction (X direction) of the uniaxially stretched film has an average reflectance of preferably 40% or less in a wavelength range of 400 nm to 800 nm for incident polarized light entering at an incident angle of zero degree, more preferably 35% or less, still more preferably 30% or less, particularly preferably 20% or less, and most preferably 15% or less. In addition, the lower limit of the average reflectance in the wavelength range of 400 nm to 800 nm for the incident polarized light entering at an incident angle of zero degree is preferably 5%.

When the average reflectance in the wavelength range of 400 nm to 800 nm for S-polarized light component entering in the perpendicular direction is in the aforementioned range, the amount of S-polarized light transmitted to the opposite side of light source increases. On the other hand, when the average reflectance for S-polarized light component is above the upper limit value, polarized light reflectance of the uniaxially stretched multi-layer film is lowered, and thus sufficient performance may not be exhibited when the film is used as a polarizing plate disposed adjacent to a liquid crystal cell. On the other hand, in the aforementioned range, as the reflectance of S-polarized light component is lower, the transmittance for S-polarized light component becomes higher. However, lowering below the lower limit value is sometimes difficult in relation to compositions or stretching.

In order to attain the aforementioned average reflectance characteristics for P-polarized light component, in the uniaxially stretched multi-layer laminate film composed by alternate lamination of the first layer and the second layer, polyesters, each of which has the aforementioned characteristics, are used as a polymer that composes each layer, and a film in-plane direction of the first layer is rendered to be birefringent by stretching in the stretching direction (X direction) at a specified stretching ratio. Accordingly, the difference in refractive indexes in the stretching direction (X direction) between the first layer and the second layer is made to be large, and thus, the above objective is attained. In addition, in order to attain the aforementioned average reflectance in the wavelength range of 400 nm to 800 nm, there may be mentioned a method of adjusting thickness of each layer of the first layer and the second layer.

Furthermore, in order to attain the aforementioned average reflectance performance for S-polarized light component, in the uniaxially stretched multi-layer laminate film composed by alternate lamination of the first layer and the second layer, the aforementioned polyester is used as a polymer constituent that composes each layer and no stretching is applied in a direction (Y direction) perpendicular to the stretching direction or stretching is kept to a low stretching ratio. In this way, the difference in refractive indexes in the perpendicular direction (Y direction) between the first layer and the second layer is made to be extremely small, and thus the above objective is attained. In addition, in order to attain the aforementioned average reflectance in the wavelength range of 400 nm to 800 nm, there may be mentioned a method of adjusting thickness of each layer of the first layer and the second layer.

Intrinsic Viscosity

The uniaxially stretched multi-layer laminate film of the present invention has an intrinsic viscosity of preferably 0.55 dL/g or more and 0.75 dL/g or less and more preferably 0.57 dL/g or more and 0.70 dL/g or less. When the intrinsic viscosity of the film is below the lower limit value, tearing strength in unstretched direction lowers and fracturing sometimes occurs in the step of producing the uniaxially stretched multi-layer laminate film or in the step of producing optical members for liquid crystal display devices. On the other hand, when the intrinsic viscosity of the film is above the upper limit value, melt viscosity increases and the productivity may be decreased.

Haze

The uniaxially stretched multi-layer laminate film of the present invention has a difference in the haze levels between before and after heat treatment at 90° C. for 1000 hours of preferably 2.0% or less and more preferably 1.0% or less. Having such haze characteristics makes the change in optical characteristics small after heat treatment. Thus, the change in the polarization characteristics is made to be small even in a high temperature environment when the film is used for a liquid crystal display device and thus the film is a used advantageously. When the difference in the haze levels between before and after heat treatment is above the upper limit value, the polarization performance after heat treatment is influenced by scattered light caused by haze and is sometimes lowered below the polarization performance before heat treatment. The haze characteristics described above are obtained by using a polyester containing naphthalene dicarboxylic acid ester in the first layer and using a copolymer polyester that has a glass transition temperature of 90° C. or higher as the copolymer polyester that composes the second layer which is the low refractive index layer.

Method of Producing Uniaxially Stretched Multi-Layer Laminate Film

Hereinafter, a method of producing the uniaxially stretched multi-layer laminate film of the present invention is described in detail.

In the uniaxially stretched multi-layer laminate film of the present invention, the number of lamination is increased in the following manner: An alternately laminated body having 300 layers or less in total is prepared by alternately laminating a polyester that composes the first layer and a polyester that composes the second layer in a fused state; thick layers (buffer layers) are disposed on both sides thereof; the alternately laminated body having the buffer layers are branched into 2 to 4 using a device called a layer doubling; and the resulting blocks of the alternately laminated body having the buffer layers are laminated again in a manner such that the number of lamination (the number of doubling) of the blocks becomes 2 to 4 times. By using the method described above, the uniaxially stretched multi-layer laminate film having an intermediate layer composed of two buffer layers laminated to each other is obtained.

The method described above in which the alternately laminated body is obtained through lamination of each layer in a fused state is also called as coextrusion method. The method has such an advantage that a layer containing a UV light absorbent is disposed in a single step of producing the multi-layer film, as compared with a method in which the layer containing a UV light absorbent is laminated to a reflective polarizer in a separate step.

The alternately laminated body is laminated in a manner such that the thickness of each layer changes stepwisely or continuously in a range of 2.0 to 5.0 times.

The unstretched multi-layer film laminated in a desired number of lamination by the method described above is stretched at least in one axial direction (in a direction along the film plane) including a film-forming direction or a widthwise direction perpendicular to the film-forming direction. The stretching temperature is preferably in a range of the glass transition temperature (Tg) of the thermoplastic resin of the first layer to Tg+50° C. In order to highly regulate the alignment characteristics of the film, a range of Tg to Tg+30° C. is more preferable.

The stretching ratio at this time is preferably 2 times to 10 times, more preferably 2.5 times to 7 times, still more preferably 3 times to 6 times, and particularly preferably 4.5 times to 5.5 times. As the stretching ratio is larger, irregularity in the plane direction of each layer in the first and second layers is made to be smaller by thin-film processing through stretching. Accordingly, optical interference of the stretched multi-layer film is equalized in the plane direction, and the difference in refraction indexes in the stretched direction between the first layer and the second layer becomes larger, which is preferable. As a stretching method used in this case, conventional stretching methods are usable, which include heat stretching with a bar heater, roll heat stretching, tenter stretching, and the like. Considering reduction of scratches caused by contact with rolls or considering the stretching speed, tenter stretching is preferable.

In addition, in the case of performing biaxial stretching, that is, stretching additionally in a direction (Y direction) perpendicular to the stretched direction, the stretching ratio is kept preferably at about 1.05 to 1.20 times. When the stretching ratio in Y direction is larger than this, polarization performance may deteriorate. Furthermore, heat fixing treatment is additionally preferably performed after stretching. While the treatment is performed at a temperature of Tg to Tg+30° C., toe-out (re-stretching) within a range of 5% to 15% is applied in the stretched direction. The alignment characteristics of the resulting uniaxially stretched multi-layer laminate film can be highly regulated.

Reflective Polarizing Film for Polarizing Plate of Liquid Crystal Display Device The uniaxially stretched multi-layer laminate film of the present invention, while it is a reflective polarizing film having a multi-layer structure, has a high polarization degree and a function as a brightness enhancing film that is capable of reflecting untransmitted polarized light for reuse. Furthermore, in a preferred embodiment of the present invention, in addition to the above described performance, the uniaxially stretched multi-layer laminate film is excellent also in heat stability and durability against UV light. Therefore, the uniaxially stretched multi-layer laminate film of the present invention is used as a polarizing plate for a liquid crystal display device, wherein the polarizing plate can be used alone adjacent to a liquid crystal cell without using an absorption type polarizing plate in combination.

Optical Member for Liquid Crystal Display Device

The present invention includes, as an embodiment thereof, an optical member for a liquid crystal display device. The member is composed of a first polarizing plate composed of the uniaxially stretched multi-layer laminate film of the present invention, a liquid crystal cell, and a second polarizing plate, which are laminated in this order. The optical member is also referred to as a liquid crystal panel. The optical member corresponds to 5 in FIG. 4, the first polarizing plate corresponds to 3, the liquid crystal cell corresponds to 2, and the second polarizing plate corresponds to "1".

Conventionally, as polarizing plates disposed on both sides of a liquid crystal cell, at least an absorption type polarizing plate is included so as to attain high polarization performance. The polarizing plate that uses the uniaxially stretched multi-layer laminate film of the present invention has excellent polarization performance, so that it is usable, in place of the absorption type polarizing plate, as a polarizing plate used adjacent to the liquid crystal cell.

Namely, features of the present invention are in an aspect of using the polarizing plate by itself, which is composed of the uniaxially stretched multi-layer laminate film of the present invention as the first polarizing plate on one side of a liquid crystal cell. Preferably, a configuration in which the first polarizing plate is laminated with the absorption type polarizing plate is eliminated.

The kind of the liquid crystal cell is not particularly limited, but any type is usable, which includes VA mode, IPS mode, TN mode, STN mode, and Bend alignment (it type) and the like.

Furthermore, the kind of the second polarizing plate is not particularly limited, but any of the absorption type polarizing plate and the reflective polarizing plate is usable. When the reflective polarizing plate is used as the second polarizing plate, the uniaxially stretched multi-layer laminate film of the present invention is preferably used.

The optical member for a liquid crystal display device of the present invention is preferably laminated in the order of the first polarizing plate, a liquid crystal cell, and the second polarizing plate. Each of these elements may be directly laminated with each other or may be laminated through a layer (hereinafter, referred to as an adhesive layer) or a protective layer.

Formation of Optical Member for Liquid Crystal Display Device

In a preferred method of disposing polarizing plates to the liquid crystal cell, both are laminated through an adhesive layer. Adhesives that compose the adhesive layer is not particularly limited, but an adhesive in which a polymer such as acrylic-based polymer, silicone-based polymer, polyester, polyurethane, polyamide, polyether, fluoro-based polymer, rubber-based polymer and the like is used as a base polymer may be appropriately selected and used. Particularly, a preferred adhesive has an excellent transparency like an acrylic-based adhesive and an adhesive performance with appropriate wettability, aggregability and adhesion, and also is excellent in weather resistance, heat resistance, and others. The adhesive layer may be provided with a plurality of layers having different compositions or of different kinds.

Considering workability in the course of laminating the liquid crystal cell and the polarizing plates, the adhesive layer is preferably disposed in advance on one or both sides of the liquid crystal cell. The thickness of the adhesive layer is appropriately selected in accordance with purposes of use, adhesion, and others. The thickness is generally 1 μm to 500 μm, preferably 5 μm to 200 μm, and particularly preferably 10 μm to 100 μm.

Separating Film

Furthermore, to the exposed face of the adhesive layer, until being provided for practical use, a separating film (separator) is preferably temporarily attached for covering for the purpose of preventing contamination and others. This prevents the adhesive layer from being touched under such a condition as usually being handled. As the separating film, for example, plastics film, rubber sheet, paper, cloth, non-woven cloth, net, foamed sheet, metal foil, laminated bodies thereof, and others are usable, which are, if needed, coated with a separating agent such as silicone-based, long chain alkyl-based, fluoro-based, molybdenum sulfide and the like.

Liquid Crystal Display Device

The present invention includes, as an embodiment thereof, a liquid crystal display device (hereinafter, referred to as a liquid crystal display, in some cases) that includes a light source and the optical member for a liquid crystal display device of the present invention, in which the first polarizing plate is disposed on the side of the light source.

Figure 4:
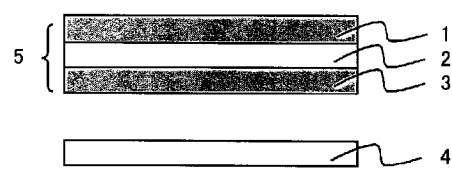
FIG. 4 shows a schematic cross-sectional view of a liquid crystal display device according to a preferred embodiment of the present invention.

FIG. 4 shows a schematic cross-sectional view of a liquid crystal display device that is an illustrative embodiment of the present invention. The liquid crystal display device includes a light source 4 and a liquid crystal panel 5. Further, if needed, a driving circuit and others are incorporated therein. The liquid crystal panel 5 includes a first polarizing plate 3 on the side of the light source 4 of a liquid crystal cell 2. In addition, on the light source side and the opposite side of the liquid crystal cell 2, that is, on the visual contact side, a second polarizing plate 1 is included. As the liquid crystal cell 2, any type of VA mode, IPS mode, TN mode, STN mode, and Bend alignment (π type) and the like is usable.

In the liquid crystal display device of the present invention, by disposing the first polarizing plate 3 composed of the uniaxially stretched multi-layer laminate film of the present invention on the light source side of the liquid crystal cell 2, the plate can be attached to the liquid crystal cell when it is used, in place of conventional absorption type polarizing plates. In particular, when the polarization degree of the uniaxially stretched multi-layer laminate film is 99.5% or more, in terms of a contrast which is given by bright part brightness/dark part brightness of a liquid crystal display, a contrast of extremely high level requested practically for a liquid crystal television can be attained.

The first polarizing plate composed of the uniaxially stretched multi-layer laminate film of the present invention has a high polarization performance comparable to conventional absorption type polarizing plates and a function as a brightness enhancement film capable of reflecting and reusing untransmitted polarized light. Therefore, a reflective polarizing plate called as a brightness enhancement film is not required to be used between the light source 4 and the first polarizing plate 3, and the functions of the brightness enhancement film and the polarizing plate attached to the liquid crystal cell can be unified. As a result, the number of members can be reduced.

Furthermore, in the liquid crystal display device of the present invention, the first polarizing plate uses, as the first layer, the uniaxially stretched multi-layer laminate film composed of the copolymer polyester containing a specific copolymer component represented by the formula (A). Accordingly, for oblique incident light, P-polarized light component entering in an oblique angle is not nearly transmitted and, at the same time, S-polarized light component entering in an oblique angle is suppressed from being reflected and is transmitted, so that the hue shift of the transmitted light with respect to the oblique incident light is suppressed. As a result, in the liquid crystal display device, colors of projected images are visible as they are.

In addition, as shown in FIG. 4, generally, the second polarizing plate 1 is disposed on the visual contact side of the liquid crystal cell 2. The second polarizing plate 1 is not particularly limited, and known ones such as the absorption type polarizing plate are usable. When the effect of outside light is extremely small, a reflective polarizing plate of the same kind with the first polarizing plate may be used as the second polarizing plate. Furthermore, on the visual contact side of the liquid crystal cell 2, various kinds of optical layers such as, for example, optical compensation films may be disposed besides the second polarizing plate.

Formation of Liquid Crystal Display Device

The liquid crystal display device of the present invention is obtained by combining the optical member (liquid crystal panel) for a liquid crystal display device and a light source, and if needed, incorporating a driving circuit and others. In addition, besides these, various kinds of members needed to form the liquid crystal display device may be combined. However, in a preferred liquid crystal display device of the present invention, light radiated from a light source is entered into the first polarizing plate.

In general, the light source of a liquid crystal display device is broadly divided into a direct light system and a side light system. In the liquid crystal display device of the present invention, any system is usable without limitation.

The liquid crystal display device thus obtained is usable in various applications including OA instruments such as monitors for personal computers, notebook personal computers, copy machines and the like, mobile instruments such as cellular phones, watches, digital cameras, personal data assistances (PDA), portable game machines and the like, electrical home appliances such as video cameras, television sets, microwave ovens and the like, in-car instruments such as back monitors, monitors for car navigation systems, car audio systems and the like, display instruments including shop information displays and the like, security gadgets such as surveillance monitors and the like, and nursing and medical instruments such as nursing monitors, medical monitors and the like.

EXAMPLES

The present invention is further described below with reference to examples, but it should be construed that the invention is in no way limited to those examples.

Note that, properties or performance in the examples were measured or evaluated by the following methods.

(1) Refractive Index and Average Refractive Index Before and after Stretching in Each Direction Each resin that composes each of the layers was fused, extruded through a die, and cast on a casting drum to prepare a film. The resulting film was stretched by 5 times in a uniaxial direction at 120° C. to prepare a stretched film. For the resulting cast film and stretched film, the refractive index (each is referred to as nX, nY, and nZ respectively) in each direction of stretched (X direction), perpendicular thereto (Y direction) and thickness (Z direction) was measured at a wavelength of 633 nm using a prism coupler manufactured by Metricon Corp. to obtain refractive indexes before and after stretching.

For the average refractive index of the polyester that composes the first layer, an average of value of the refractive indexes in each direction before stretching was used as the average refractive index. Furthermore, for the average refractive index of the polyester that composes the second layer, an average of value of the refractive indexes in each direction after stretching was used as the average refractive index.

(2) Wavelength-Based Transmittances of P-Polarized Light and S-Polarized Light, Average Transmittance, Polarization Degree, and Hue of the Film For the resulting uniaxially stretched multi-layer laminate film, transmittance for P-polarized light, transmittance for S-polarized light, and polarization degree were measured using a polarization degree measurement instrument ("VAP7070S" manufactured by JASCO Corp.).

Polarization degree (P in %) is represented by the following equation, wherein, a measured value obtained when the transmission axis of a polarizing filter is adjusted in a manner such that it coincides with the stretching direction (X direction) of the film is assigned to P-polarized light, and a measured value obtained when the transmission axis of a polarizing filter is adjusted in a manner such that it is perpendicular to the stretching direction of the film is assigned to S-polarized light.

$$\text{Polarization degree}(P)=\{(Ts-Tp)/(Tp+Ts)\}\times 100 \quad (1)$$

In the equation (1), Tp represents an average transmittance for P-polarized light in a wavelength range of 400 nm to 800 nm, and Ts represents an average transmittance for S-polarized light in a wavelength range of 400 nm to 800 nm.

The measurement was performed while the incident angle of measurement light was selected to be zero degree.

In addition, for S-polarized light, the transmittance in the wavelengths of 380 nm, 400 nm, and 420 nm was measured.

Further, by using a C light source, the hue (L, a, b) of the uniaxially stretched multi-layer laminate film was determined. The value of Cab was calculated by the following equation (2).

$$Cab=\sqrt{((a-a0)^2+(b-b0)^2)} \quad (2)$$

In the equation, each of "a" and "b" represents the hue of the uniaxially stretched multi-layer film, and each of "a0" and "b0" represents the hue of a reference polarizing plate (absorption type polarizing plate X).

By using Cab obtained, the hue of films was evaluated in accordance with the following criteria.

AA: Cab is less than 0.5

A: Cab is 0.5 or more and less than 3.0

B: Cab is 3.0 or more (3) Average Reflectance

A total light reflectance of a barium sulfide reference plate and a reflective polarizing film was measured in a wavelength range of 400 nm to 800 nm by using a spectrophotometer ("MPC-3100" manufactured by Shimadzu Corp.) and disposing a polarizing filter on the side of a light source. The measured value obtained by arranging the transmission axis of the polarizing filter in the stretched direction (X direction) of the film was assigned to P-polarized light. The measured value obtained by arranging the transmission axis of the polarizing filter perpendicular to the stretched direction of the film was assigned to S-polarized light. For each polarized light component, an average value of reflectance in the wavelength range of 400 nm to 800 nm was used as the average reflectance. Note that, the measurement was performed by setting the incident angle of the measurement light to zero degree.

(4) Weight Losses of Visible Light Absorbent and UV Light Absorbent

The weight loss percentages of a visible light absorbent and a UV light absorbent were measured by using a differential thermal analysis/thermogravimetry simultaneous measurement instrument ("TG-DTA220" (trade name) manufactured by Seiko Instrument Inc.) in the following manner: an aliquot of about 5 mg of a sample was loaded in the instrument, and temperature was elevated from 25° C. to 300° C. at a temperature elevation rate of 10° C./min and kept for 1 hour (60 minutes), and the weight loss percentages (unit in %) were measured.

(5) Amounts of Visible Light Absorbent and UV Light Absorbent (5-1) Measurement of the Amounts of Pigment and UV Light Absorbent (Inorganic Compound)

For a uniaxially stretched multi-layer laminate film, each layer containing an additive was collected to obtain a sample. The sample was dissolved in a solvent that dissolves resin but does not dissolve the pigment. Subsequently, the pigment was separated centrifugally from the resin, and the amount of the pigment was determined based on the ratio (ppm) of the pigment relative to the weight of the specimen. The kind of the pigment was identified by a quantitative analysis and the like of metal elements using SEM-XMA and ICP.

(5-2) Measurement of the Amount of an Organic Dye and a UV Light Absorbent (Organic Compound)

For a uniaxially stretched multi-layer laminate film, each layer containing an additive was collected in an amount of 5 mg, and was dissolved in 0.5 mL of a mixed solvent of deuterotrifluoroacetic acid/deuterochloroform (1/1). The amount of the organic dye or the UV light absorbent was quantitatively analyzed using $^1$H-NMR (50° C., 600 MHz).

(6) Identification of the Polyester and Quantification of the Copolymer Components and Each Component For each layer of the film, components of the polyester, copolymer components, and each component were quantified by $^1$H-NMR measurement.

(7) Melting Point (Tm) and Glass Transition Temperature (Tg) of the Polyester

Samples of 10 mg each were sampled from each layer. The melting point and the glass transition temperature were measured at a temperature elevation rate of 20° C./min by using DSC ("DSC2920" (trade name), manufactured by TA Instrument Corp.).

(8) Intrinsic Viscosity

The polyester film for the first layer was dissolved in p-chlorophenol/1,1,2,2-tetrachloroethane (6:4 by weight ratio), and then the viscosity of the resulting solution was measured at 35° C. The intrinsic viscosity was calculated by using the following equation (3) based on the results of the measurement.

$$\eta sp/C=[\eta]+K[\eta]^2 \cdot C \quad (3)$$

Here, $\eta sp=$(solution viscosity/solvent viscosity)$^{-1}$, C represents the weight (g/100 mL) of the dissolved polymer per 100 (mL) of the solvent, and K is Huggins constant. The solution viscosity and the solvent viscosity were measured using an Ostwald viscometer. The unit thereof is represented by dL/g.

The polyester for the second layer and a film were dissolved in o-chlorophenol, and then the solution viscosity was measured at a temperature of 35° C. The intrinsic viscosity was calculated according to the above equation based on the results of the measurement.

(9) Thickness of Each Layer

The uniaxially stretched multi-layer laminate film was cut out into 2 mm in the longitudinal direction and 2 cm in the widthwise direction, fixed in an embedding capsule, and embedded by using an epoxy resin ("EPOMOUNT" manufactured by Refine Tech Corp.). The embedded sample was cut out perpendicularly to the surface in the widthwise direction using a microtome ("ULTRACUT UCT" manufactured by LEICA Corp.) to obtain a 5 nm-thick thin film. Observation and photographing using a transmission electron microscope (Hitachi S-4300) at an acceleration voltage of 100 kV were performed. The thickness of each layer was measured based on the resulting pictures.

Among layers having a thickness of 1 μm or more, the one present inside the multi-layer structure is referred to as an intermediate layer and the one present in the outermost surface layer is referred to as an outermost layer. The thickness of each layer was measured. In addition, in the case where more than one intermediate layers were present, the thickness of the intermediate layers was obtained from the average value thereof.

In addition, based on the thickness of each layer obtained, a ratio of the maximum thickness with respect to the minimum thickness in the first layer and a ratio of the maximum thickness with respect to the minimum thickness in the second layer were obtained.

In addition, an average thickness of the first layer and an average thickness of the second layer were obtained based on the thickness of each layer obtained. A ratio of the average thickness of the second layer with respect to the average thickness of the first layer was calculated.

Note that, when the thicknesses of the first and second layers were evaluated, the intermediate layer and the outermost layer were eliminated from the first and second layers.

(10) Total Thickness of Film

A film sample was nipped in a spindle gauge head ("K107C" manufactured by Anritsu Electric Co., Ltd.). Using a digital differential electronic micrometer ("K351" manufactured by Anritsu Electric Co., Ltd.), a thickness was measured at 10 different positions, and an average value thereof was calculated to obtain the film thickness.

(11) Durability Against UV Light

A film sample was exposed for 200 hours under the conditions of 765 W/cm (black panel temperature: 60° C.) to a Xenon light fastness testing machine ("SUNTEST CPS+" manufactured by Atlas Corp.). The hue before and after the exposure was measured by using a color-difference meter ("SZ-Σ90 manufactured by Nippon Denshoku Industries Co., Ltd.). From tristimulus values of X, Y and Z, L*, a* and b* values were obtained in accordance with JIS-K7105; and Δb* was calculated by using the following equation (4). A standard light C was used as the light source. Durability against UV light was evaluated on the basis of the following criteria.

$$\Delta b^* = (b^* \text{ value after exposure}) - (b^* \text{ value before exposure}) \quad (4)$$

AA: Δb* is less than 1
A: Δb* is 1 or more and less than 3
B: Δb* is 3 or more and less than 6
C: Δb* is 6 or more

(12) Brightness Enhancement Effect and Display Hue

The liquid crystal display device obtained was used as a display for a personal computer. When white color was displayed by the personal computer, the front brightness of the picture screen of the liquid crystal display was measured using an FPD view angle measurement evaluation apparatus (ErgoScope88) manufactured by Opto Design Inc. The percent of enhancement in brightness with respect to Reference Example 1 was calculated and brightness enhancement effect was evaluated on the basis of the following criteria.

AA: Brightness enhancement effect is 160% or more
A: Brightness enhancement effect is 150% or more and less than 160%
B: Brightness enhancement effect is 140% or more and less than 150%
C: Brightness enhancement effect is less than 140%

At the same time, hue of the display was evaluated in terms of the maximum change in hue x and the maximum change in hue y with respect to the reference polarizing plate (absorption type polarizing plate X) on the basis of the following criteria.

AA: the maximum changes in both x and y are less than 0.03
A: either of the maximum changes in x and y is less than 0.03 and the other maximum change is 0.03 or more
C: the maximum changes in both x and y are 0.03 or more

(13) Contrast Evaluation

The liquid crystal display device obtained was used as a display for a personal computer. When white color and black color screens were displayed by the personal computer, the front brightness of the picture screen of the liquid crystal display was measured using an FPD view angle measurement evaluation apparatus (ErgoScope88) manufactured by Opto Design Inc. Light brightness was obtained from the white screen and dark brightness was obtained from the black screen. Contrast that is calculated from light brightness/dark brightness was evaluated on the basis of the following criteria.

AA: contrast (light brightness/dark brightness) is 2000 or more
A: contrast (light brightness/dark brightness) is 1000 or more and less than 2000
C: contrast (light brightness/dark brightness) is less than 1000

Example 1

In the presence of titanium tetrabutoxide, 2,6-naphthalene dimethyl dicarboxylate, 6,6'-(ethylenedioxy)di-2-naphthonic acid, and ethylene glycol were subjected to esterification and ester-exchange. After subsequent polycondensation, an aromatic polyester used as the polyester for the first layer was prepared. The aromatic polyester had an intrinsic viscosity of 0.62 dL/g and contained 2,6-naphthalene dicarboxylic acid component (in Tables, referred to as PEN) at 65 mol % of the acid component, 6,6'-(ethylenedioxy)di-2-naphthoic acid component (in Tables, referred to as ENA) at 35 mol % of the acid component, and ethylene glycol as the glycol component. As the polyester for the second layer, a copolymer polyethylene terephthalate (IA20PET) was prepared, which had an intrinsic viscosity of 0.62 dL/g (orthochlorophenol, 35° C.) and contained 20 mol % of isophthalic acid.

To thus prepared polyester for the first layer, as a visible light absorbent-a, carbon black ("PRINTEX ES 34" (trade name) manufactured by EVONIK INDUSTRIES (average particle size, 33 nm)) was added in an amount of 0.12 wt % (1200 ppm) on the basis of the weight of the first layer. To the polyester for the second layer, a benzoxazinone-based UV light absorbent (in Table 1, referred to as C) represented by the following formula (C-1) was added in an amount of 0.4 wt %.

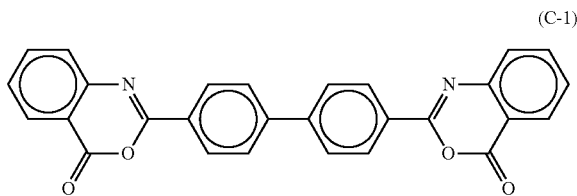

The resin compositions for each layer were dried at 170° C. for 5 hours, subsequently, they were supplied to a first and a second extruders and heated to 300° C. to bring them into a fused state. The polyester for the first layer was branched into 138 layers. The polyester for the second layer was branched into 137 layers. Then, a fused laminate body having a total of 275 layers in which the first layer and the second layer were alternately laminated was produced by using a multi-layer feed block apparatus, wherein the first layer and the second layer were alternately laminated, and the maximum layer thickness and the minimum layer thickness in each of the first layer and the second layer were forced to change continuously until the ratio of maximum/minimum became 3.1 times (first layer) and 3.0 times (second layer). On both sides of the fused laminated body, while keeping the fused state, the same polyester as the polyester for the second layer was introduced from a third extruder into a three layer feed block apparatus, so that buffer layers were laminated in the lamination direction of the fused laminate on both sides of the fused laminate body of a total of 275 layers. The amount supplied to the third extruder was adjusted in a manner such that the sum of the buffer layers on both sides was 23% of the resulting whole body. The laminate was further branched into three using a layer doubling block and laminated in a ratio of 1:1:1. The resulting laminate of a total of 829 layers, including two intermediate layers inside thereof and two outermost layers in the outermost surface layer thereof, was introduced into a die while keeping the lamination state and cast on a casting drum so as to adjust the average thickness ratio between the first layer and the second layer to 1.0:1.2. In this way, a uniaxially unstretched multi-layer laminate film having a total of 829 layers was prepared.

The unstretched multi-layer film was stretched by 5.2 times in the widthwise direction at 120° C., and then the film was subjected to heat fixing treatment at 120° C. for 3 seconds while the film was stretched by 15% in the same direction at 120° C. The resulting uniaxially stretched multi-layer laminate film had a thickness of 105 μm.

Formation of Liquid Crystal Panel

Except that, in place of polarizing plate X used as a first polarizing plate on the side of a light source in Reference Example 1 described below, the uniaxially stretched multi-layer laminate film obtained above was used, a liquid crystal panel was obtained substantially similarly to Reference Example 1, in which the uniaxially stretched multi-layer laminate film obtained above (first polarizing plate) was disposed on the main face of the liquid crystal cell on the side of a light source and the polarizing plate X (second polarizing plate) was disposed on the main face on the side of visual contact.

Fabrication of Liquid Crystal Display Device

The liquid crystal panel described above was incorporated in the original liquid crystal display used in Reference Example 1. The light source of the liquid crystal display device was lighted and brightness of a white screen and a black screen of a personal computer was evaluated.

Resin compositions and characteristics of each layer of the resulting uniaxially stretched multi-layer laminate film, properties of the uniaxially stretched multi-layer laminate film, and properties of the liquid crystal display device are shown in Tables 1 and 2.

Examples 2 to 12

As shown in Table 1, except that resin compositions of each layer, kinds of the visible light absorbent and UV light absorbent, the amount added, layer thickness, the number of doubling, and production conditions were changed, a uniaxially stretched multi-layer film was obtained substantially similarly to Example 1, and a liquid crystal panel was formed by using the film as a first polarizing plate and a liquid crystal display was fabricated.

Note that, NDC20PET used as the polyester for the second layer in Example 2 is a copolymer polyester given by replacing the copolymer component of the copolymer polyethylene terephthalate (IA20PET) containing 20 mol % of isophthalic acid used as the polyester for the second layer in Example 1 by 2,6-naphthalene dicarboxylic acid. Similarly, the polyester for the second layer in example 3 is a copolymer polyester (NDC71A4PET) in which the copolymer component is replaced by 7 mol % of 2,6-naphthalene dicarboxylic acid and 4 mol % of isophthalic acid. The polyester for the second layer in Example 4 is a blend (ENA21PEN/PCT blend) obtained by mixing ENA21PEN that is the polyester for the first layer and "PCTAAN004" (polycyclohexane dimethylene terephthalate-isophthalate copolymer) manufactured by Eastman Chemical Corp. in a weight ratio of 2:1, wherein ENA21PEN is an aromatic polyester containing 2,6-naphthalene dicarboxylic acid component at 79 mol % of the acid component, 6,6'-(ethylenedioxy)di-2-naphthonic acid component at 21 mol % of the acid component, and ethylene glycol as the glycol component.

Furthermore, the polyester for the second layer in Example 7 is a copolymer polyethylene terephthalate (NDC25SPG15PET, (intrinsic viscosity of 0.70 dL/g)) containing 25 mol % of 2,6-naphthalene dicarboxylic acid and 15 mol % of spiroglycol. The polyester for the second layer in Example 8 is a copolymer polyethylene terephthalate (NDC30CHDM80PET) containing 30 mol % of 2,6-naphthalene dicarboxylic acid and 80 mol % of cyclohexane dimethanol.

As a visible light absorbent-b, an organic black dye (a 1:1 blend of "KAYASET RED A2B" (trade name) manufactured by NIPPON KAYAKU Corp. and "KAYASET GREEN AN" (trade name) manufactured by NIPPON KAYAKU Corp.) was used.

Furthermore, in Examples 2, 10, and 11, a triazine-based UV light absorbent (in Table 1, referred to as B) that is represented by the following formula (B-1) was used.

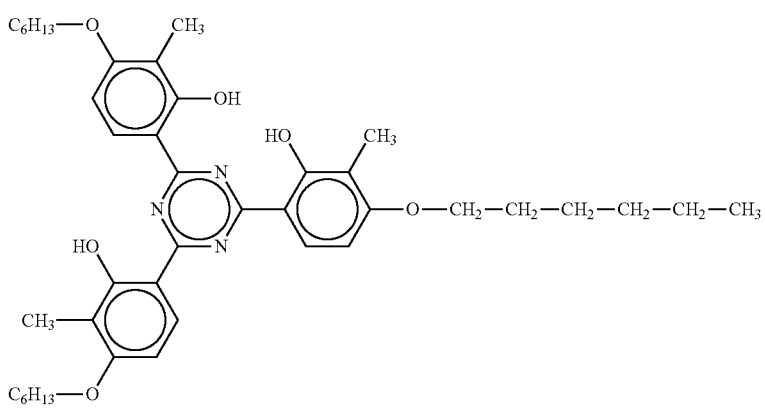

(B-1)

Reference Example 1

Preparation of Polarizer

A polymer film ("9P75R" (trade name), manufactured by Kuraray Corp., having a thickness of 75 μm, an average polymerization degree of 2400, and a saponification degree of 99.9 mol %) containing a polyvinyl alcohol as a main ingredient was stretched and conveyed between rolls that have different circumferential speeds from each other while being dyed. At first, the polyvinyl alcohol film obtained was immersed in a 30° C. water bath for 1 minute and stretched by 1.2 times in a conveying direction while the film is swollen. Subsequently, the film was immersed for 1 minute at 30° C. in an aqueous solution containing 0.03 wt % of potassium iodide and 0.3 wt % of iodine, and the film was stretched by 3 times with respect to a totally unstretched film (original length) in the conveying direction while the film was dyed. Then, the film was stretched by 6 times with respect to the original length in the conveying direction while the film was immersed for 30 seconds at 60° C. in an aqueous solution containing 4 wt % of boric acid and 5 wt % of potassium iodide. Next, the resulting stretched film was dried at 70° C. for 2 minutes to obtain a polarizer. Note that, the polarizer had a thickness of 30 μm and a water content of 14.3 wt %.

Preparation of Adhesive

An aqueous solution containing 3.7 wt % of solid contents was prepared by dissolving 100 parts by weight of polyvinyl alcohol resin having an acetoacetyl group (an average polymerization degree of 1200, saponification degree of 98.5%, and 5 mol % of acetoacetylation degree) and 50 parts by weight of methylol melamine in pure water at a temperature of 30° C. An adhesive aqueous solution was prepared by adding 18 weight part of an aqueous solution containing 10 wt % concentration of a solid of alumina colloid having an average particle diameter of 15 nm and having positive charges to 100 parts by weight of the aqueous solution. The adhesive aqueous solution had a viscosity of 9.6 mPa·s and a pH of 4 to 4.5. The amount of the alumina colloid was 74 parts by weight with respect to 100 parts by weight of the polyvinyl alcohol resin.

Preparation of Absorption Type Polarizing Plate

On one face of an optical isotropic element ("FUJITAC ZRF80S" (trade name), manufactured by Fujifilm Corp.) having a thickness of 80 μm, a front face retardation of 0.1 nm, and a thickness direction retardation of 1.0 nm, the aforementioned adhesive containing alumina colloid was coated in a manner such that the thickness after drying became 80 nm. The resultant element was laminated to the one face of the aforementioned polarizer by roll-to-roll processing in a manner such that both conveying directions became parallel to each other. Then, similarly, on the opposite face of the polarizer, the aforementioned adhesive containing alumina colloid was coated on one face of an optical isotropic element ("FUJITAC ZRF80S" (trade name) manufactured by Fujifilm Corp.; containing Tinuvin 326 and 328 as UV light absorbents), in a manner such that the thickness after drying became 80 nm. The resultant element was laminated by roll-to-roll processing in a manner such that both conveying directions became parallel to each other. Then, a polarizing plate was obtained after 55° C. drying for 6 minutes. The polarizing plate is referred to as "polarizing plate X".

Preparation of Liquid Crystal Panel

A liquid crystal panel was removed from a liquid crystal television set ("AQUOS LC-20E90" manufactured by Sharp Corp. in the year of 2011) which was equipped with a VA-mode liquid crystal cell and employed a direct backlight. A polarizing plate and an optical compensation film disposed on the top and bottom of the liquid crystal cell were removed. The glass faces (front and rear) of the liquid crystal cell were cleaned. Then, the aforementioned polarizing plate X was disposed on the light source side of the liquid crystal cell through an acrylic adhesive, in the same direction with the absorption axis of the polarizing plate that had been disposed on the light source side of the original liquid crystal panel.

Next, the visual contact side of the aforementioned polarizing plate X was disposed on the liquid crystal cell through an acrylic adhesive, in the same direction with the absorption axis of the polarizing plate that had been disposed on the visual contact side of the original liquid crystal panel. In this way, a liquid crystal panel was obtained in which the polarizing plate X was disposed on the one main face of the liquid crystal cell and the polarizing plate X was disposed on the other main face thereof.

Fabrication of Liquid Crystal Display Device

The liquid crystal panel described above was incorporated in the original liquid crystal display device. The light source of the liquid crystal display device was lighted, and a white color screen and a black color screen were displayed by using a personal computer. Then, brightness, contrast, and hue of display of the liquid crystal display device were evaluated.

Comparative Example 1

Except that the visible light absorbent and the UV light absorbent were not contained, a uniaxially stretched multi-layer laminate film was obtained substantially similarly to Example 1. A liquid crystal panel was prepared by using the film as a first polarizing plate and a liquid crystal display was fabricated.

Comparative Examples 2 to 6

As shown in Table 1, except that resin compositions, kinds or the added amount of the visible light absorbent, kinds or the added amount of the UV light absorbent werechanged, a uniaxially stretched multi-layer laminate film was obtained substantially similarly to Example 1. A liquid crystal panel was prepared by using the film as a first polarizing plate and a liquid crystal display was fabricated. An organic dichroic black dye ("S-428" (trade name) manufactured by Mitsui Fine Chemicals, Inc.) was used as a visible light absorbent-c.

Resin compositions of each layer of thus obtained uniaxially stretched multi-layer laminate film, characteristics of each layer, properties of the uniaxially stretched multi-layer laminate film, and properties of the liquid crystal display device are shown in Tables 1 and 2.

TABLE 1-1

| | Polyester | | | First layer Visible light absorbent | | | | UV light absorbent | | | Polyester | | | Second layer Visible light absorbent | | | UV light absorbent | | |
|---|---|---|---|---|---|---|---|---|---|---|---|---|---|---|---|---|---|---|---|
| | Kind | Melting Point (°C.) | Number of layers | Kind | Content [ppm] | Weight loss [%] | Kind | Content [ppm] | Weight loss [%] | Kind | Tg (°C.) | Number of layers | Kind | Content [ppm] | Weight loss [%] | Kind | Content [Wt %] | Weight loss [%] |
| Example 1 | ENA35PEN | 204 | 138 | a | 1,200 | 0.2 | — | — | — | IA20PET | 70 | 137 | — | — | — | C | 0.4 | 0.8 |
| Example 2 | ENA12PEN | 247 | 138 | b | 1,200 | 4.8 | — | — | — | NDC20PET | 84 | 137 | — | — | — | B | 0.2 | 0.5 |
| Example 3 | ENA21PEN | 230 | 138 | b | 1,000 | 4.8 | — | — | — | NDC7 IA4PET | 80 | 137 | — | — | — | C | 0.5 | 0.8 |
| Example 4 | ENA21PEN | 230 | 138 | a | 300 | 0.2 | — | — | — | ENA21PEN/ PCT blend | 89 | 137 | — | — | — | C | 0.05 | 0.8 |
| Example 5 | ENA21PEN | 230 | 138 | a | 2,000 | 0.2 | — | — | — | IA20PET | 70 | 137 | — | — | — | C | 1.0 | 0.8 |
| Example 6 | ENA21PEN | 230 | 138 | a | 2,000 | 0.2 | — | — | — | IA20PET | 70 | 137 | — | — | — | C | 1.0 | 0.8 |
| Example 7 | ENA21PEN | 230 | 138 | b | 1,000 | 4.8 | — | — | — | NDC25 SPG15PET | 93 | 137 | — | — | — | C | 0.5 | 0.8 |
| Example 8 | ENA35PEN | 204 | 138 | a | 800 | 0.2 | — | — | — | NDC30 CHDM80PET | 94 | 137 | — | — | — | C | 0.4 | 0.8 |
| Example 9 | ENA12PEN | 247 | 138 | b | 400 | 4.8 | — | — | — | IA20PET | 70 | 137 | — | — | — | — | — | — |
| Example 10 | ENA21PEN | 230 | 138 | b | 400 | 4.8 | — | — | — | IA20PET | 70 | 137 | — | — | — | B | 6 | 0.5 |
| Example 11 | ENA35PEN | 204 | 138 | b | 400 | 4.8 | — | — | — | IA20PET | 70 | 137 | — | — | — | B | 0.1 | 0.5 |
| Example 12 | ENA21PEN | 230 | 138 | — | — | — | B | 0.4 | 0.5 | IA20PET | 70 | 137 | b | 400 | 4.8 | — | — | — |
| Comparative Example 1 | ENA35PEN | 204 | 138 | — | — | — | — | — | — | IA20PET | 70 | 137 | — | — | — | — | — | — |
| Comparative Example 2 | ENA21PEN | 230 | 138 | a | 12,000 | 4.8 | — | — | — | IA20PET | 70 | 137 | — | — | — | B | 0.2 | 0.5 |
| Comparative Example 3 | ENA35PEN | 204 | 138 | a | 3,000 | 0.2 | — | — | — | IA20PET | 70 | 137 | — | — | — | B | 0.2 | 0.5 |
| Comparative Example 4 | ENA21PEN | 230 | 138 | a | 100 | 0.2 | — | — | — | IA20PET | 70 | 137 | — | — | — | B | 0.2 | 0.5 |
| Comparative Example 5 | ENA35PEN | 204 | 138 | a | 2,000 | 0.2 | — | — | — | IA20PET | 70 | 137 | — | — | — | B | 0.2 | 0.5 |
| Comparative Example 6 | ENA21PEN | 230 | 138 | c | 2,000 | 85.0 | — | — | — | IA20PET | 70 | 137 | — | — | — | B | 0.2 | 0.5 |

| | Outermost layer/Intermidiate layer/Outermost layer [μm] | Total thickness [μm] | First layer Min. thickness [nm] | First layer Max. thickness [nm] | First layer Max/Min | Second layer Min. thickness [nm] | Second layer Max. thickness [nm] | Second layer Max/Min | Stretching in the direction of film formation Magnification (times) | Stretching in the direction of film formation Temperature (°C.) | Stretching in the widthwise direction of film Magnification (times) | Stretching in the widthwise direction of film Temperature (°C.) | Toe-out | Heat fixing Temperature (°C.) | Number of optical interference layers | Thickness of optical interference layers per unit [μm] | Number of doubling |
|---|---|---|---|---|---|---|---|---|---|---|---|---|---|---|---|---|---|
| Example 1 | 4/8/8/4 | 105 | 40 | 124 | 3.1 | 46 | 138 | 3.0 | 1.0 | — | 5.2 | 120 | 15% | 120 | 275 | 27 | 3 |
| Example 2 | 4/8/8/4 | 105 | 40 | 125 | 3.1 | 48 | 140 | 2.9 | 1.0 | — | 4.5 | 120 | 15% | 120 | 275 | 27 | 3 |
| Example 3 | 6/12/12/6 | 117 | 41 | 126 | 3.1 | 45 | 139 | 3.1 | 1.0 | — | 4.6 | 125 | 10% | 120 | 275 | 27 | 3 |
| Example 4 | 5/10/10/5 | 110 | 42 | 126 | 3.0 | 46 | 140 | 3.0 | 1.0 | — | 4.6 | 125 | 10% | 125 | 275 | 27 | 3 |
| Example 5 | 5/10/10/5 | 110 | 41 | 126 | 3.1 | 47 | 141 | 3.0 | 1.0 | — | 5.2 | 120 | 15% | 120 | 275 | 27 | 3 |

TABLE 1-1-continued

| | | | | | | | | | | | | |
|---|---|---|---|---|---|---|---|---|---|---|---|---|
| Example 6 | 4/8/8/4 | 105 | 42 | 128 | 3.0 | 46 | 140 | 3.0 | 1.0 | — | 5.2 | 120 | 15% |
| Example 7 | 6/12/12/6 | 117 | 41 | 126 | 3.1 | 45 | 139 | 3.1 | 1.0 | — | 4.6 | 120 | 10% |
| Example 8 | 4/8/8/4 | 105 | 40 | 124 | 3.1 | 46 | 138 | 3.0 | 1.0 | — | 5.2 | 130 | 15% |
| Example 9 | 4/8/8/4 | 105 | 40 | 125 | 3.1 | 46 | 138 | 3.0 | 1.0 | — | 5.2 | 120 | 15% |
| Example 10 | 4/8/8/4 | 105 | 42 | 128 | 3.0 | 46 | 138 | 3.0 | 1.0 | — | 5.2 | 120 | 15% |
| Example 11 | 4/8/8/4 | 105 | 40 | 124 | 3.1 | 46 | 138 | 3.1 | 1.0 | — | 5.2 | 120 | 15% |
| Example 12 | 4/8/8/4 | 105 | 42 | 128 | 3.0 | 46 | 138 | 3.0 | 1.0 | — | 5.2 | 120 | 15% |
| Comparative Example 1 | 4/8/8/4 | 105 | 40 | 124 | 3.1 | 46 | 138 | 3.0 | 1.0 | — | 5.2 | 120 | 15% |
| Comparative Example 2 | 4/8/8/4 | 105 | 42 | 128 | 3.0 | 46 | 138 | 3.0 | 1.0 | — | 5.2 | 120 | 15% |
| Comparative Example 3 | 4/8/8/4 | 105 | 40 | 124 | 3.1 | 46 | 138 | 3.1 | 1.0 | — | 5.2 | 120 | 15% |
| Comparative Example 4 | 4/8/8/4 | 105 | 42 | 128 | 3.0 | 46 | 138 | 3.0 | 1.0 | — | 5.2 | 120 | 15% |
| Comparative Example 5 | 4/8/8/4 | 105 | 40 | 124 | 3.1 | 46 | 138 | 3.0 | 1.0 | — | 5.2 | 120 | 15% |
| Comparative Example 6 | 4/8/8/4 | 105 | 42 | 128 | 3.0 | 46 | 140 | 3.0 | 1.0 | — | 5.2 | 120 | 15% |

TABLE 2

| | Polymer for first layer | | | | Polymer for second layer | | | | Uniaxial stretching multi-layer laminate film | | | | |
|---|---|---|---|---|---|---|---|---|---|---|---|---|---|
| | Refractive index after uniaxial stretching | | | Average refractive index | Refractive index after uniaxial stretching | | | Average refractive index | Transmittance per wavelength | | | Average transmittance | |
| | | | | | | | | | | | | Transmittance for P-polarized light | Transmittance for S-polarized light |
| | nX | nY | nZ | | nX | nY | nZ | | 380 nm [%] | 400 nm [%] | 420 nm [%] | [%] | [%] |
| Example 1 | 1.83 | 1.58 | 1.57 | 1.64 | 1.58 | 1.58 | 1.58 | 1.58 | 2.0 | 60 | 77 | 0.10 | 80.0 |
| Example 2 | 1.88 | 1.60 | 1.55 | 1.64 | 1.60 | 1.60 | 1.60 | 1.60 | 3.0 | 72 | 78 | 0.03 | 85.0 |
| Example 3 | 1.83 | 1.58 | 1.57 | 1.64 | 1.59 | 1.59 | 1.59 | 1.59 | 1.0 | 40 | 75 | 0.02 | 78.0 |
| Example 4 | 1.83 | 1.58 | 1.57 | 1.64 | 1.58 | 1.58 | 1.58 | 1.58 | 4.0 | 75 | 80 | 0.15 | 85.0 |
| Example 5 | 1.83 | 1.58 | 1.57 | 1.64 | 1.58 | 1.58 | 1.58 | 1.58 | 0.5 | 40 | 70 | 0.02 | 70.0 |
| Example 6 | 1.83 | 1.58 | 1.57 | 1.64 | 1.58 | 1.58 | 1.58 | 1.58 | 0.5 | 40 | 70 | 0.20 | 80.0 |
| Example 7 | 1.87 | 1.57 | 1.54 | 1.66 | 1.58 | 1.58 | 1.58 | 1.58 | 1.0 | 46 | 74 | 0.02 | 80.0 |
| Example 8 | 1.83 | 1.58 | 1.57 | 1.64 | 1.57 | 1.57 | 1.57 | 1.57 | 2.0 | 61 | 77 | 0.03 | 80.0 |
| Example 9 | 1.88 | 1.60 | 1.55 | 1.64 | 1.58 | 1.58 | 1.58 | 1.58 | 40 | 78 | 80 | 0.03 | 80.0 |
| Example 10 | 1.83 | 1.58 | 1.57 | 1.64 | 1.58 | 1.58 | 1.58 | 1.58 | 0.2 | 25 | 79 | 0.03 | 80.0 |
| Example 11 | 1.83 | 1.58 | 1.57 | 1.64 | 1.58 | 1.58 | 1.58 | 1.58 | 15 | 75 | 80 | 0.03 | 81.0 |
| Example 12 | 1.83 | 1.58 | 1.57 | 1.64 | 1.58 | 1.58 | 1.58 | 1.58 | 2.0 | 61 | 78 | 0.02 | 89.0 |
| Reference example 1 | | | | | | | | | | | | | |
| Comparative example 1 | 1.83 | 1.58 | 1.57 | 1.64 | 1.58 | 1.58 | 1.58 | 1.58 | 41 | 86 | 88 | 0.50 | 89.0 |
| Comparative example 2 | 1.83 | 1.58 | 1.57 | 1.64 | 1.58 | 1.58 | 1.58 | 1.58 | 2.0 | 60 | 88 | 0.50 | 88.0 |
| Comparative example 3 | 1.83 | 1.58 | 1.57 | 1.64 | 1.58 | 1.58 | 1.58 | 1.58 | 2.0 | 49 | 46 | 0.03 | 45.0 |
| Comparative example 4 | 1.83 | 1.58 | 1.57 | 1.64 | 1.58 | 1.58 | 1.58 | 1.58 | 2.0 | 60 | 65 | 0.03 | 58.0 |
| Comparative example 5 | 1.83 | 1.58 | 1.57 | 1.64 | 1.58 | 1.58 | 1.58 | 1.58 | 2.0 | 86 | 86 | 0.40 | 88.0 |
| Comparative example 6 | 1.83 | 1.58 | 1.57 | 1.64 | 1.58 | 1.58 | 1.58 | 1.58 | 2.0 | 60 | 88 | 0.50 | 88.0 |

| | Uniaxial stretching multi-layer laminate film | | | | Display evaluation | | | |
|---|---|---|---|---|---|---|---|---|
| | | Average reflectance | | | | | | |
| | Polarization degree [%] | Reflectance for P-polarized light [%] | Reflectance for S-polarized light [%] | Hue | Durability against UV light | Brightness enhancement effect | Contrast | Hue |
| Example 1 | 99.75 | 89.9 | 7.1 | AA | AA | A | A | AA |
| Example 2 | 99.93 | 90.0 | 7.2 | A | A | AA | AA | A |
| Example 3 | 99.95 | 90.0 | 8.0 | AA | AA | A | AA | AA |
| Example 4 | 99.65 | 89.9 | 9.5 | A | A | AA | A | A |
| Example 5 | 99.94 | 90.0 | 6.0 | A | AA | A | AA | A |
| Example 6 | 99.50 | 89.8 | 6.1 | A | AA | AA | A | A |
| Example 7 | 99.95 | 90.0 | 9.0 | AA | AA | AA | AA | AA |
| Example 8 | 99.93 | 90.0 | 9.0 | AA | AA | AA | AA | AA |
| Example 9 | 99.93 | 90.0 | 9.9 | B | C | AA | AA | C |
| Example 10 | 99.93 | 90.0 | 9.9 | B | AA | AA | AA | C |
| Example 11 | 99.93 | 90.0 | 9.3 | B | B | AA | AA | C |
| Example 12 | 99.96 | 90.0 | 10.0 | AA | B | AA | AA | C |
| Reference example 1 | | | | | A | C | AA | AA |
| Comparative example 1 | 98.88 | 89.5 | 10.0 | B | C | AA | C | C |
| Comparative example 2 | 99.50 | 89.5 | 10.0 | A | A | AA | C | A |
| Comparative example 3 | 99.87 | 90.0 | 5.6 | AA | A | C | AA | AA |
| Comparative example 4 | 99.90 | 90.0 | 7.0 | AA | A | C | AA | AA |
| Comparative example 5 | 99.10 | 89.6 | 9.8 | B | B | AA | C | C |
| Comparative example 6 | 99.5 | 89.5 | 5.6 | A | A | AA | C | A |

Example 13

In the presence of titanium tetrabutoxide, 2,6-naphthalene dimethyl dicarboxylate, 6,6'-(ethylenedioxy)di-2-naphthonic acid and ethylene glycol were subjected to esterification and ester-exchange. After subsequent polycondensation, an aromatic polyester used as a polyester for the first layer was prepared. The aromatic polyester had an intrinsic viscosity of 0.62 dL/g and contained 2,6-naphthalene dicarboxylic acid component (in Tables, referred to as PEN) at 65 mol % of the acid component, 6,6'-(ethylenedioxy)di-2-naphthoic acid component (in Tables, referred to as ENA) at 35 mol % of the acid component, and ethylene glycol as the glycol component. As the polyester for the second layer, a copolymer polyethylene terephthalate (IA20PET) was prepared, which had an intrinsic viscosity of 0.62 dL/g (orthochlorophenol, 35° C.) and contained 20 mol % of isophthalic acid.

The polyesters thus prepared for the first and second layers were dried at 170° C. for 5 hours, and were supplied to a first and a second extruders and heated to 300° C. to bring them into a fused state. The polyester for the first layer was branched into 138 layers. The polyester for the second layer was branched into 137 layers. Then, a fused laminate body having a total of 275 layers in which the first layer and the second layer were alternately laminated was produced by using a multi-layer feed block apparatus, wherein the first layer and the second layer were alternately laminated, and the maximum layer thickness and the minimum layer thickness in each of the first layer and the second layer were forced to change continuously until the ratio of maximum/minimum became 2.2 times in the first layer and the second layer. On both sides of the fused laminated body, while keeping the fused state, a resin that is the same as the polyester for the second layer and containing 400 ppm of carbon black ("PRINTEX ES 34" (trade name), manufactured by VONIK INDUSTRIES, having an average size of 33 nm) as visual light absorbent-a was introduced from a third extruder into a three layer feed block, so that buffer layers were laminated in the lamination direction of the fused laminate, on both sides of the fused laminate body of a total of 275 layers. The amount supplied to the third extruder was adjusted in a manner such that the sum of the buffer layers on both sides became 23% of the resulting whole body. The laminate was further branched into three with a layer doubling block and laminated in a ratio of 1:1:1. The resulting laminate of a total of 829 layers, including two intermediate layers inside thereof and two outermost layers in the outermost surface layer thereof, was introduced into a die while keeping the lamination state and cast on a casting drum so as to adjust the average thickness ratio between the first layer and the second layer in 1.0:1.2. In this way, a uniaxially unstretched multi-layer laminate film having a total of 829 layers was prepared.

The unstretched multi-layer film was stretched by 5.2 times in a widthwise direction at 120° C., and then the film was subjected to heat fixing treatment at 120° C. for 3 seconds while the film was stretched by 15% in the same direction at 120° C. The resulting uniaxially stretched multi-layer laminate film had a thickness of 105 μm. By using the resulting film, a liquid crystal panel was prepared substantially similarly to Example 1, as a first polarizing plate and a liquid crystal display was fabricated.

Resin compositions and characteristics of each layer of the resulting uniaxially stretched multi-layer laminate film are shown in Table 3. Also, properties of the uniaxially stretched multi-layer laminate film and the liquid crystal display are shown in Table 4.

Examples 14 to 16

As shown in Table 3, except that kinds and the added amount of visible light absorbent, resin compositions and the thickness of each layer, and production conditions were changed, a uniaxially stretched multi-layer laminate film was obtained substantially similarly to Example 13. A liquid crystal panel was prepared by using the resulting film as a first polarizing plate substantially similarly to Example 1, and a liquid crystal display was fabricated.

Resin compositions of each layer of thus obtained uniaxially stretched multi-layer laminate film and characteristics of each layer are shown in Table 3. Also, properties of the uniaxially stretched multi-layer laminate film and the liquid crystal display device are shown in Table 4.

Note that, as the visible light absorbent in Example 14, visible light absorbent-d (organic black dye ("LUM OGEN BLACK" (trade name), manufactured by BASF) was used.

"NDC30SPG20PET" used as the polyester for the second layer in Example 16 is a copolymer polyethylene terephthalate (intrinsic viscosity: 0.70 dL/g) containing 30 mol % of 2,6-naphthalene dicarboxylic acid and 20 mol % of spiroglycol.

Example 17

Except that, on both faces of the uniaxially stretched multi-layer laminate film obtained in Example 13, 5 μm thick layers composed of the same composition as in the buffer layers of Example 13 were further laminated and a film having a total thickness of 115 μm was prepared, operations substantially similar to Example 13 were repeated. Properties of the uniaxially stretched multi-layer laminate film and the liquid crystal display are shown in Table 4. Even though the thickness of the outermost layers composed of the same composition as the intermediate layers was made thicker, no effect was observed in the polarization degree.

Comparative Examples 7 to 9

As shown in Table 1, except that any of the added amount of visible light absorbent and the thickness of the intermediate layer was changed, a uniaxially stretched multi-layer laminate film was obtained substantially similarly to Example 13. A liquid crystal panel was prepared by using the resulting film as a first polarizing plate and a liquid crystal display was fabricated. Resin compositions of each layer of thus obtained uniaxially stretched multi-layer laminate film and characteristics of each layer are shown in Table 3. Also, properties of the uniaxially stretched multi-layer laminate film and the liquid crystal display device are shown in Table 4.

TABLE 3

| | First layer | | | Second layer | | | Visible light absorbent (Intermediate layer) | | | Number of optical interference layers | Thickness of optical interference layers per unit [μm] |
|---|---|---|---|---|---|---|---|---|---|---|---|
| | Resin | Melting Point (° C.) | Number of layers | Resin | Tg (° C.) | Number of layers | Kind | Content [ppm] | Weight loss [%] | | |
| Example 13 | ENA35PEN | 204 | 138 | IA20PET | 70 | 137 | a | 400 | 0.2 | 275 | 27 |
| Example 14 | ENA21PEN | 230 | 138 | NDC7 IA4PET | 80 | 137 | d | 500 | 9.0 | 275 | 27 |
| Example 15 | ENA21PEN | 230 | 138 | IA20PET | 70 | 137 | a | 1000 | 0.2 | 275 | 27 |
| Example 16 | ENA35PEN | 204 | 138 | NDC30 SPG20PET | 98 | 137 | a | 400 | 0.2 | 275 | 27 |
| Comparative example 7 | ENA35PEN | 204 | 138 | IA20PET | 70 | 137 | a | 10 | 0.2 | 275 | 27 |
| Comparative example 8 | ENA35PEN | 204 | 138 | IA20PET | 70 | 137 | a | 3000 | 0.2 | 275 | 27 |
| Comparative example 9 | ENA35PEN | 204 | 138 | IA20PET | 70 | 137 | a | 200 | 0.2 | 275 | 27 |

| | Number of doubling | Outermost layer/ Intermediate layer/ Intermediate layer/ Outermost layer [μm] | Total thickness [μm] | Layer thickness ratio (Second layer/first Layer) | First layer | | | Second layer | | |
|---|---|---|---|---|---|---|---|---|---|---|
| | | | | | Min. thickness [nm] | Max. thickness [nm] | Max/Min | Min. thickness [nm] | Max. thickness [nm] | Max/Min |
| Example 13 | 3 | 4/8/8/4 | 105 | 2.6 | 40 | 124 | 3.1 | 46 | 138 | 3.0 |
| Example 14 | 3 | 6/12/12/6 | 117 | 2.6 | 41 | 126 | 3.1 | 45 | 139 | 3.1 |
| Example 15 | 3 | 1.5/3/3/1.5 | 90 | 2.6 | 41 | 126 | 3.1 | 47 | 141 | 3.0 |
| Example 16 | 3 | 4/8/8/4 | 105 | 2.6 | 40 | 124 | 3.1 | 46 | 138 | 3.0 |
| Comparative example 7 | 3 | 4/8/8/4 | 105 | 2.6 | 40 | 124 | 3.1 | 46 | 138 | 3.0 |
| Comparative example 8 | 3 | 4/8/8/4 | 105 | 2.6 | 40 | 124 | 3.1 | 46 | 138 | 3.0 |
| Comparative example 9 | 3 | 0.5/1/1/0.5 | 84 | 2.6 | 40 | 124 | 3.1 | 46 | 138 | 3.0 |

| | Stretching in film forming direction | | Stretching in widthwise direction of film | | | Heat fixing |
|---|---|---|---|---|---|---|
| | Magnification (times) | Temperature (° C.) | Magnification (times) | Temperature (° C.) | Toe-out | Temperature (° C.) |
| Example 13 | 1.0 | — | 5.2 | 120 | 15% | 120 |
| Example 14 | 1.0 | — | 4.6 | 120 | 10% | 120 |
| Example 15 | 1.0 | — | 5.2 | 120 | 15% | 120 |
| Example 16 | 1.0 | — | 5.2 | 130 | 15% | 130 |
| Comparative example 7 | 1.0 | — | 5.2 | 120 | 15% | 120 |
| Comparative example 8 | 1.0 | — | 5.2 | 120 | 15% | 120 |
| Comparative example 9 | 1.0 | — | 5.2 | 120 | 15% | 120 |

TABLE 4

| | Polymer for first layer | | | | Polymer for second layer | | | | Uniaxial stretching multi-layer laminate film Average transmittance | |
|---|---|---|---|---|---|---|---|---|---|---|
| | Refractive index after uniaxial stretching | | | Average refractive index | Refractive index after uniaxial stretching | | | Average refractive index | Transmittance for P-polarized light [%] | Transmittance for S-polarized light [%] |
| | nX | nY | nZ | | nX | nY | nZ | | | |
| Example 13 | 1.83 | 1.58 | 1.57 | 1.64 | 1.58 | 1.58 | 1.58 | 1.58 | 0.10 | 80.0 |
| Example 14 | 1.83 | 1.58 | 1.57 | 1.64 | 1.59 | 1.59 | 1.59 | 1.59 | 0.02 | 78.0 |
| Example 15 | 1.83 | 1.58 | 1.57 | 1.64 | 1.58 | 1.58 | 1.58 | 1.58 | 0.02 | 70.0 |
| Example 16 | 1.87 | 1.57 | 1.54 | 1.66 | 1.58 | 1.58 | 1.58 | 1.58 | 0.10 | 80.0 |
| Example 17 | 1.83 | 1.58 | 1.57 | 1.64 | 1.58 | 1.58 | 1.58 | 1.58 | 0.09 | 76.5 |

TABLE 4-continued

| | | | | | | | | | | |
|---|---|---|---|---|---|---|---|---|---|---|
| Comparative example 7 | 1.83 | 1.58 | 1.57 | 1.64 | 1.58 | 1.58 | 1.58 | 1.58 | 0.40 | 88.0 |
| Comparative example 8 | 1.83 | 1.58 | 1.57 | 1.64 | 1.58 | 1.58 | 1.58 | 1.58 | 0.01 | 45.0 |
| Comparative example 9 | 1.83 | 1.58 | 1.57 | 1.64 | 1.58 | 1.58 | 1.58 | 1.58 | 0.45 | 88.0 |

| | | Uniaxial stretching multi-layer laminate film | | | |
|---|---|---|---|---|---|
| | | | Average reflectance | | |
| | Polarization degree | Reflectance for P-polarized light [%] | Reflectance for S-polarized light [%] | Brightness enhancement effect | Contrast |
| Example 13 | 99.75 | 89.9 | 9.0 | AA | AA |
| Example 14 | 99.95 | 90.0 | 8.0 | A | AA |
| Example 15 | 99.94 | 90.0 | 6.0 | A | AA |
| Example 16 | 99.75 | 89.9 | 9.0 | AA | AA |
| Example 17 | 99.76 | 89.9 | 9.0 | A | AA |
| Comparative example 7 | 99.10 | 89.6 | 9.9 | AA | C |
| Comparative example 8 | 99.96 | 90.0 | 5.6 | C | AA |
| Comparative example 9 | 99.98 | 89.6 | 9.8 | AA | C |

INDUSTRIAL APPLICABILITY

According to the present invention, the uniaxially stretched multi-layer laminate film of the present invention has a capability of exhibiting by itself an extremely high polarization degree of 99.5% or more and is applicable as a high performance reflective polarizing plate comparable to an absorption type polarizing plate, in a simpler configuration than before. Accordingly, an optical member for a liquid crystal display device and a liquid crystal display device that have a high contrast can be provided.

The invention claimed is:

1. A uniaxially stretched multi-layer laminate film, in which a first layer and a second layer are alternately laminated, comprising an intermediate layer which is inside of the alternately laminated configuration of the first and second layers and which has a thickness of 2 μm or more and 30 μm or less, wherein
    (1) the first layer is composed of a polyester containing a naphthalene dicarboxylic acid ester,
    (2) the second layer is composed of a copolymer polyester and is an optically isotropic layer having an average refractive index of 1.50 or more and 1.60 or less,
    (3) the first layer, the second layer, both first and second layers, or the intermediate layer contains a visible light absorbent that exhibits a weight loss of less than 10% when the visible light absorbent is kept at 300° C. for 1 hour, in an amount of 200 ppm or more and 2500 ppm or less on the basis of the weight of each layer, and
    (4) the uniaxially stretched multi-layer laminate film has a polarization degree (P %) represented by the following equation (1) of 99.5 or more and an average transmission Ts of 60% or more for S-polarized light in a wavelength range of 400 nm to 800 nm, Polarization degree$(P)=\{(Ts-Tp)/(Tp+Ts)\}\times 100$     (1)

wherein Tp represents an average transmission for P-polarized light in a wavelength range of 400 nm to 800 nm and Ts represents an average transmission for S-polarized light in a wavelength range of 400 nm to 800 nm.

2. The uniaxially stretched multi-layer laminate film according to claim 1, wherein the second layer and/or the intermediate layer further contains a UV light absorbent that exhibits a weight loss of less than 3% when the UV light absorbent is kept at 300° C. for 1 hour, in an amount of 0.2 wt % to 5 wt %, and the uniaxially stretched multi-layer laminate film has a transmission of less than 5% for S-polarized light at 380 nm.

3. The uniaxially stretched multi-layer laminate film according to claim 2, wherein the transmission of the uniaxially stretched multi-layer laminate film for S-polarized light at 400 nm is 10% or more and less than 80%.

4. The uniaxially stretched multi-layer laminate film according to claim 1, wherein the polyester that composes the first layer and contains a naphthalene dicarboxylic acid ester is a copolymer polyester that contains a naphthalene dicarboxylic acid ester.

5. The uniaxially stretched multi-layer laminate film according to claim 4, wherein the copolymer polyester that composes the first layer and contains the naphthalene dicarboxylic acid ester contains
    (i) a component represented by the following Formula (A) as a dicarboxylic acid component in an amount of 5 mol % or more and 50 mol % or less and a naphthalene dicarboxylic acid component in an amount of 50 mol % or more and 95 mol % or less, Formula (A)

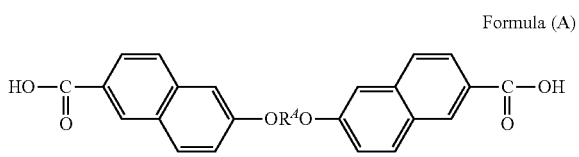

wherein $R^A$ represents an alkylene group having 2 to 10 atoms, and
    (ii) a diol component that has an alkylene group having 2 to 10 carbon atoms in an amount of 90 mol % or more and 100 mol % or less as a diol component.

6. The uniaxially stretched multi-layer laminate film according to claim 1, wherein the copolymer polyester that composes the second layer is a copolymer polyester that has a glass transition temperature of 90° C. or higher.

7. The uniaxially stretched multi-layer laminate film according to claim 1, wherein the copolymer polyester that composes the second layer contains an alicyclic diol as a copolymer component.

8. The uniaxially stretched multi-layer laminate film according to claim 7, wherein the alicyclic diol is at least one kind selected from the group consisting of spiroglycol, tricyclodecane dimethanol, and cyclohexane dimethanol.

9. The uniaxially stretched multi-layer laminate film according to claim 1, wherein the visible light absorbent is at least one kind selected from the group consisting of inorganic pigment, organic dye, and organic pigment, and is black or gray.

10. The uniaxially stretched multi-layer laminate film according to claim 9, wherein the inorganic pigment is carbon black.

11. The uniaxially stretched multi-layer laminate film according to claim 2, wherein the UV light absorbent is a compound represented by the following Formula (B):

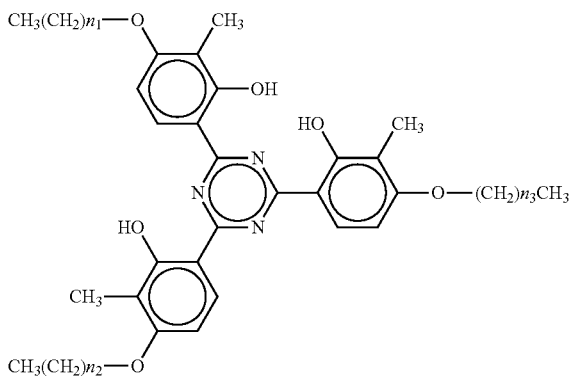

Formula (B)

wherein each of n1, n2, and n3 represents respectively any integer of 4 to 10, or Formula (C):

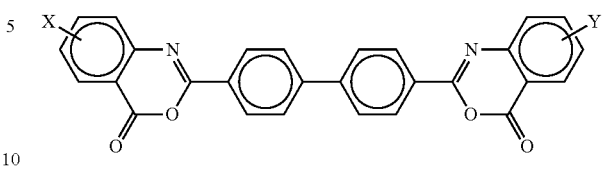

Formula (C)

wherein each of X and Y represents a hydrogen or an alkyl group having 1 to 4 carbon atoms.

12. The uniaxially stretched multi-layer laminate film according to claim 1,
wherein it is used in a manner adjacent to a liquid crystal cell.

13. The uniaxially stretched multi-layer laminate film according to claim 1,
wherein, it is obtained by a coextrusion method.

14. A polarizing plate, comprising the uniaxially stretched multi-layer laminate film according to claim 1.

15. An optical member for a liquid crystal display device, comprising:
a first polarizing plate composed of the polarizing plate according to claim 14, a liquid crystal cell, and a second polarizing plate, laminated in this order.

16. The optical member for a liquid crystal display device according to claim 15, wherein a configuration in which the first polarizing plate is laminated with an absorption type polarizing plate is excluded.

17. The optical member according to claim 15,
wherein the second polarizing plate is an absorption type polarizing plate.

18. An optical member, comprising a first polarizing plate, a liquid crystal cell, and a second polarizing plate laminated in this order,
wherein the first polarizing plate and the second polarizing plate are composed of the polarizing plate according to claim 14.

19. A liquid crystal display device, comprising a light source and the optical member for a liquid crystal display device according to claim 15,
wherein the first polarizing plate is disposed on the side of the light source.

20. The liquid crystal display device according to claim 19,
wherein a reflective polarizing plate is not additionally disposed between the light source and the first polarizing plate.

* * * * *